US010693624B2

(12) United States Patent
Ji et al.

(10) Patent No.: US 10,693,624 B2
(45) Date of Patent: Jun. 23, 2020

(54) SIGNAL SENDING DEVICE, SIGNAL RECEIVING DEVICE, SYMBOL TIMING SYNCHRONIZATION METHOD, AND SYSTEM

(71) Applicant: HUAWEI TECHNOLOGIES CO., LTD., Shenzhen, Guangdong (CN)

(72) Inventors: Tong Ji, Beijing (CN); Yiling Wu, Beijing (CN); Guangwei Yu, Beijing (CN); Robert William Young, Cambridge (GB); Brian Martin Gaffney, Cambridge (GB)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/967,371

(22) Filed: Apr. 30, 2018

(65) Prior Publication Data
US 2018/0248680 A1  Aug. 30, 2018

Related U.S. Application Data

(63) Continuation of application No. PCT/CN2015/093385, filed on Oct. 30, 2015.

(51) Int. Cl.
*H04L 7/04*     (2006.01)
*H04J 11/00*    (2006.01)
(Continued)

(52) U.S. Cl.
CPC .......... *H04L 7/041* (2013.01); *H04J 11/0069* (2013.01); *H04J 13/0062* (2013.01);
(Continued)

(58) Field of Classification Search
None
See application file for complete search history.

(56) References Cited

U.S. PATENT DOCUMENTS 9,853,808 B2 * 12/2017 Zhou .................... H04B 1/7083
2008/0274753 A1 * 11/2008 Attar .................... G01S 5/0205
455/456.6
(Continued)

FOREIGN PATENT DOCUMENTS

CN         101409584 A    4/2009
CN         102223696 A    10/2011
(Continued)

OTHER PUBLICATIONS

A. Andreescu, A. Ghita, A. A. Enescu and C. Anghel, "Long Term Evolution primary synchronization algorithms," 2010 9th International Symposium on Electronics and Telecommunications, Timisoara, 2010, pp. 125-128. (Year: 2010).*
(Continued)

*Primary Examiner* — Ayaz R Sheikh
*Assistant Examiner* — Tarell A Hampton
(74) *Attorney, Agent, or Firm* — Womble Bond Dickinson (US) LLP

(57) ABSTRACT

The present invention relates to the field of wireless communications technologies. In a receiving device, a receiving module receives a synchronization signal including a first signal and a second signal. The first signal includes N1 generalized ZC sequences, and the second signal includes N2 generalized ZC sequences. The second signal is used to distinguish different cells or different cell groups. There are at least two generalized ZC sequences with different root indexes in (N1+N2) generalized ZC sequences. A processing module performs a first sliding correlation operation and a second sliding correlation operation on the synchronization signal, and performs symbol timing synchronization according to a relationship between a sliding correlation peak generated when a sliding correlation is performed on the N1 generalized ZC sequences and a sliding correlation peak
(Continued)

generated when a sliding correlation is performed on the N2 generalized ZC sequences.

19 Claims, 10 Drawing Sheets

(51) Int. Cl.
   *H04J 13/00* (2011.01)
   *H04W 56/00* (2009.01)
   *H04L 27/26* (2006.01)
   *H04W 4/70* (2018.01)
(52) U.S. Cl.
   CPC ...... *H04L 27/2662* (2013.01); *H04L 27/2663* (2013.01); *H04W 56/00* (2013.01); *H04W 56/001* (2013.01); *H04L 27/2657* (2013.01); *H04L 27/2671* (2013.01); *H04W 4/70* (2018.02)

(56) References Cited

U.S. PATENT DOCUMENTS

| | | | |
|---|---|---|---|
| 2009/0202029 A1 | 8/2009 | Nazar et al. | |
| 2010/0046663 A1 | 2/2010 | Han et al. | |
| 2010/0291925 A1* | 11/2010 | Nagata | H04J 11/0069 455/434 |
| 2011/0007717 A1* | 1/2011 | Swarts | H04J 11/0069 370/336 |
| 2012/0044818 A1* | 2/2012 | Lindoff | H04L 1/0036 370/252 |
| 2014/0029584 A1 | 1/2014 | Qu et al. | |
| 2015/0103870 A1 | 4/2015 | Kim et al. | |
| 2015/0117295 A1* | 4/2015 | Yeh | H04W 56/001 370/312 |
| 2015/0124579 A1* | 5/2015 | Sartori | H04J 11/00 370/210 |
| 2016/0205644 A1* | 7/2016 | Seo | H04W 56/00 370/350 |
| 2016/0205645 A1* | 7/2016 | Pajukoski | H04W 56/001 370/350 |
| 2016/0218821 A1* | 7/2016 | Adhikary | H04J 11/0069 |
| 2016/0227462 A1* | 8/2016 | Axmon | H04W 36/32 |
| 2016/0286506 A1 | 9/2016 | Chae et al. | |
| 2016/0286507 A1* | 9/2016 | Yang | H04W 56/002 |
| 2016/0330703 A1* | 11/2016 | Shim | H04W 56/001 |
| 2016/0337159 A1* | 11/2016 | Seo | H04W 56/002 |
| 2017/0041892 A1 | 2/2017 | Xia et al. | |
| 2017/0135052 A1* | 5/2017 | Lei | H04J 13/0062 |
| 2017/0257891 A1* | 9/2017 | Lindoff | H04W 74/0833 |

FOREIGN PATENT DOCUMENTS

| | | |
|---|---|---|
| CN | 102868660 A | 1/2013 |
| CN | 104202712 A | 12/2014 |
| CN | 104509191 A | 4/2015 |
| CN | 104703164 A | 6/2015 |
| CN | 104734802 A | 6/2015 |
| CN | 105007150 A | 10/2015 |
| WO | 2008/075881 A2 | 6/2008 |
| WO | 2009047732 A2 | 4/2009 |
| WO | 2011/054794 A1 | 5/2011 |
| WO | 2015/065017 A1 | 5/2015 |

OTHER PUBLICATIONS

ETSI Technical Specification ETSI TS 136 211 V9.1.0 (Apr. 2010): "LTE; Evolved Universal Terrestrial Radio Access (E-UTRA); Physical channels and modulation".*
XP002784858 Malik. M. U. Gul, "Timing and Frequency Synchronization for Orthogonal Frequency Division Multiple-Access Systems—A Thesis Presented to the Academic Faculty",Georgia Institute of Technology,Aug. 2014,total 18 pages.
"3GPP TS 36.213 V12.7.0 (Sep. 2015) 3rd Generation Partnership Project;Technical Specification Group Radio Access Network;Evolved Universal Terrestrial Radio Access (E-UTRA);Physical layer procedures(Release 12), Technical Specification, 241 pages".
"3GPP TS 36.211 V12.7.0 (Sep. 2015) 3rd Generation Partnership Project;Technical Specification Group Radio Access Network;Evolved Universal Terrestrial Radio Access (E-UTRA);Physical channels and modulation(Release 12), Technical Specification, 136 pages".
Huawei et al.,"Remaining details of D2D synchronization signals",3GPP TSG RAN WG1 Meeting #78 R1-142843,Dresden, Germany, Aug. 18-21, 2014, total 19 pages.
Intel Corporation,"Design of Primary D2D Synchronization Signal",3GPP TSG RAN WG1 Meeting #79 R1-144648,San Francisco, USA, Nov. 17-21, 2014,total 12 pages.
ITL Inc.,"Remaining details on D2D synchronization signal design",3GPP TSG RAN WG1 Meeting #79 R1-145108,San Francisco, USA, Nov. 17-21, 2014 ,total 5 pages.
LG Electronics,"Details of D2DSS design",3GPP TSG RAN WG1 Meeting #79 R1-144877,San Francisco, USA, Nov. 17-21, 2014, total 6 pages.

* cited by examiner

SIGNAL SENDING DEVICE, SIGNAL RECEIVING DEVICE, SYMBOL TIMING SYNCHRONIZATION METHOD, AND SYSTEM

CROSS-REFERENCE TO RELATED APPLICATIONS

This application is a continuation of International Application No. PCT/CN2015/093385, filed on Oct. 30, 2015, the disclosure of which is hereby incorporated by reference in its entirety.

TECHNICAL FIELD

The present invention relates to the field of wireless communications technologies, and in particular, to a signal sending device, a signal receiving device, a symbol timing synchronization method, and a system.

BACKGROUND

As machine-to-machine (M2M) communications technologies rapidly develop, a market requirement and scale explosively grow in recent years.

A terminal with an M2M service encounters a low-consumption and low-cost challenge. Crystal oscillator accuracy of the M2M terminal is relatively low due to a cost limitation. Consequently, the M2M terminal has a relatively large frequency offset relative to a communication peer end (such as a base station). A signal phase rotation may be generated in a time domain due to the frequency offset.

In a Long Term Evolution (LTE) system, a Zadoff-Chu (ZC) sequence is used as a primary synchronization sequence, to perform symbol timing synchronization and carrier frequency offset estimation.

UE implements symbol timing synchronization by using an autocorrelation feature of the ZC sequence, that is, determines a symbol position and an optimal sampling point by using a position in which a correlation peak is generated when a sliding correlation is performed. The method has a precondition, that is, in sequence duration, signal phase deflection (generated due to frequency offset existence and a relative movement between sending and receiving ends) cannot be excessively large, for example, cannot exceed π.

Currently, the crystal oscillator accuracy of the M2M terminal is generally 20 parts per million (PPM). In a case in which a carrier frequency in the LTE system is 2 GHz, 20-PPM crystal oscillator accuracy means that the frequency offset is approximately 40 kHz. If an example in which a symbol rate in the LTE system is 15 kHz is used, a phase in one symbol may rotate by 40/15×2π, which is close to 6π. However, a signal generally occupies at least one symbol in a time domain. Consequently, grid search needs to be performed multiple times to compensate for such a large phase rotation, because when the frequency offset is excessively large, the terminal can only eliminate frequency offset impact by performing blind tests on different frequency offset values. An example in which a frequency interval of the grid search is 50 Hz is used, and the grid search may be performed 800 times due to the foregoing 40 kHz frequency offset. Consequently, implementation complexity of the M2M terminal greatly increases.

In conclusion, for a terminal with relatively low crystal oscillator accuracy, such as a current low-cost M2M terminal, a relatively large phase rotation is caused due to a frequency offset, grid search needs to be performed multiple times to compensate for the relatively large phase rotation, and implementation complexity of the terminal is relatively high.

SUMMARY

In view of this, embodiments of the present invention provide a signal sending device, a signal receiving device, a symbol timing synchronization method, and a system, to resolve a problem that implementation complexity of symbol timing synchronization is high because a terminal with relatively low crystal oscillator accuracy has a relatively large frequency offset.

According to a first aspect, an embodiment of the present invention provides a receiving device, including:

a receiving module, configured to receive a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi un(n+1+2q)/L}, q \in Z, L \in Z^+, n=0,1,\ldots L-1,$$
$$0<|u|<L, u \in R,$$

where u is a root index of the generalized ZC sequence, q is an offset index of the generalized ZC sequence, L is a length of the generalized ZC sequence, and L is a positive integer;

different cells or different cell groups correspond to different second signals; and there are at least two generalized ZC sequences in (N1+N2) generalized ZC sequences including the N1 generalized ZC sequences and the N2 generalized ZC sequences, and root indexes of the two generalized ZC sequences are different; and a processing module, configured to: perform a first sliding correlation operation on the synchronization signal by using each of the N1 generalized ZC sequences locally stored by the receiving device; traverse at least two groups of N2 generalized ZC sequences that are locally stored, and for each group of N2 generalized ZC sequences that are traversed, perform a second sliding correlation operation on the received synchronization signal by using each generalized ZC sequence in the group of N2 generalized ZC sequences; perform symbol timing synchronization according to a result of each first sliding correlation operation and a result of each second sliding correlation operation; and if different cells correspond to different second signals, determine, according to the result of each first sliding correlation operation and the result of each second sliding correlation operation, a cell identifier of a cell in which the receiving device is located; or if different cell groups correspond to different second signals, determine, according to the result of each first sliding correlation operation and the result of each second sliding correlation operation, a cell group identifier of a cell group in which the receiving device is located.

With reference to the first aspect, in a first possible implementation, the processing module is specifically configured to: when N1=N2=1, the N1 generalized ZC sequence is a first generalized ZC sequence, and the N2 generalized ZC sequence is a second generalized ZC sequence, perform the first sliding correlation operation on the synchronization signal by using the first generalized ZC sequence locally stored by the receiving device; and perform the second sliding correlation operation on the synchronization signal by using each of at least two second generalized ZC sequences locally stored by the receiving device.

With reference to the first possible implementation of the first aspect, in a second possible implementation, the processing module is further configured to: before performing the first sliding correlation operation and the second sliding correlation operation, determine each frequency offset $f_i$ that is in a frequency offset range of the receiving device and that is an integer multiple of a symbol rate;

when performing the first sliding correlation operation on the synchronization signal by using the first generalized ZC sequence locally stored by the receiving device, the processing module is specifically configured to:

for each determined frequency offset $f_i$, perform a sliding correlation operation on the synchronization signal by using the first generalized ZC sequence, to obtain a sliding correlation peak Corr1_$f_i$ in the frequency offset by means of calculation, where i=1, . . . , and P, i and P are positive integers, and P is a quantity of determined frequency offsets;

when performing the second sliding correlation operation on the synchronization signal by using each of the at least two second generalized ZC sequences locally stored by the receiving device, the processing module is specifically configured to:

for each determined frequency offset $f_i$ traverse each of the at least two second generalized ZC sequences locally stored by the receiving device; and for each traversed second generalized ZC sequence $S_j$, perform a sliding correlation operation on the synchronization signal by using the second generalized ZC sequence, to obtain a sliding correlation peak Corr2_$f_i$_$S_j$ in the second generalized ZC sequence in the frequency offset by means of calculation, where j=1, . . . , and Q, j and Q are positive integers, and Q is a quantity of locally stored second generalized ZC sequences; and when performing the symbol timing synchronization according to the result of each first sliding correlation operation and the result of each second sliding correlation operation, the processing module is specifically configured to:

determine, from all frequency offsets $f_i$ according to each obtained sliding correlation peak Corr1_$f_i$ and each obtained sliding correlation peak Corr2_$f_i$_$S_j$, a frequency offset $f_0$ closest to an actual frequency offset and a second generalized ZC sequence $S_0$ that corresponds to the cell in which the receiving device is located; and perform the symbol timing synchronization according to a time domain position of a sliding correlation peak Corr1_$f_0$ corresponding to the determined frequency offset $f_0$, a time domain position of a sliding correlation peak Corr2_$f_0$_$S_0$ in the second generalized ZC sequence $S_0$ in the determined frequency offset $f_0$, and a distance that is known in advance and that is between a time domain position of a start symbol occupied by the first generalized ZC sequence in the synchronization signal and a time domain position of a start symbol occupied by the second generalized ZC sequence in the synchronization signal.

With reference to the second possible implementation of the first aspect, in a third possible implementation, when determining, according to the result of each first sliding correlation operation and the result of each second sliding correlation operation, the cell identifier of the cell in which the receiving device is located, the processing module is specifically configured to: determine, according to a correspondence that is pre-stored by the receiving device and that is between a cell identifier and a second generalized ZC sequence, that a cell identifier corresponding to the second generalized ZC sequence $S_0$ is the cell identifier of the cell in which the receiving device is located; and/or when determining, according to the result of each first sliding correlation operation and the result of each second sliding correlation operation, the cell group identifier of the cell group in which the receiving device is located, the processing module is specifically configured to: determine, according to a correspondence that is pre-stored by the receiving device and that is between a cell group identifier and a second generalized ZC sequence, that a cell group identifier corresponding to the second generalized ZC sequence $S_0$ is the cell group identifier of the cell group in which the receiving device is located.

With reference to the second or the third possible implementation of the first aspect, in a fourth possible implementation, the processing module is specifically configured to:

determine that a frequency offset corresponding to a sliding correlation peak Corr_max is $f_0$, where $$\text{Corr\_max} = \underset{i,j}{\text{MAX}}\{\text{Corr1\_}f_i + \text{Corr2\_}f_i\_S_j\};$$

and determine that a second generalized ZC sequence corresponding to the sliding correlation peak Corr_max is $S_0$.

With reference to the second or the third possible implementation of the first aspect, in a fifth possible implementation, the processing module is specifically configured to:

if a frequency offset corresponding to a greatest sliding correlation peak in all obtained Corr1_$f_i$ is equal to a frequency offset corresponding to a greatest sliding correlation peak in all obtained Corr2_$f_i$_$S_j$, determine that $f_0$ is the corresponding frequency offset, and determine that a second generalized ZC sequence corresponding to a greatest sliding correlation peak in all Corr2_$f_0$_$S_j$ is $S_0$.

With reference to any one of the second to the fifth possible implementations of the first aspect, in a sixth possible implementation, the first generalized ZC sequence is before the second generalized ZC sequence in a time domain, and when performing the symbol timing synchronization, the processing module is specifically configured to:

determine that the position $pos_1$ of the start symbol occupied by the first generalized ZC sequence is:

$$pos_1 = x_1 - \frac{L_1 u_2 (x-y)}{u_1 L_2 - u_2 L_1},$$

where $x_1$ is the time domain position of the sliding correlation peak Corr1_$f_0$, $x_2$ is the time domain position of the sliding correlation peak Corr2_$f_0$_$S_0$, $x=x_2-x_1$, y is the distance that is known in advance and that is between the time domain position of the start point of the first generalized ZC sequence in the synchronization signal and the time domain position of the start point of the second generalized ZC sequence in the synchronization signal, $u_1$ is a root index of the first generalized ZC sequence, $u_2$ is a root index of the second generalized ZC sequence, $L_1$ is a length of the first generalized ZC sequence, and $L_2$ is a length of the second generalized ZC sequence;

determine a position of each symbol in the received signal according to the determined position of the start symbol occupied by the first generalized ZC sequence and a symbol length that is known in advance; and perform at least one of the following three operations:

determining a frame start position in the received signal according to a relative position that is known in advance and that is of the first generalized ZC sequence in a frame;

determining a subframe start position in the received signal according to a relative position that is known in advance and that is of the first generalized ZC sequence in a subframe; or determining a timeslot start position in the received signal according to a relative position that is known in advance and that is of the first generalized ZC sequence in a timeslot.

With reference to any one of the second to the sixth possible implementations of the first aspect, in a seventh possible implementation, the processing module is further configured to:

after determining, from all frequency offsets $f_i$, the frequency offset $f_0$ closest to the actual frequency offset, determine the actual frequency offset F according to the time domain position of the sliding correlation peak Corr1_$f_0$ in the frequency offset $f_0$, the time domain position of the sliding correlation peak Corr2_$f_0$_$S_0$ in the second generalized ZC sequence in the frequency offset $f_0$, the distance that is known in advance and that is between the time domain position of the start symbol occupied by the first generalized ZC sequence in the synchronization signal and the time domain position of the start symbol occupied by the second generalized ZC sequence in the synchronization signal, and the frequency offset $f_0$.

With reference to the seventh possible implementation of the first aspect, in an eighth possible implementation, $$F = f_0 + \frac{Bu_1 u_2 (x-y)}{u_1 L_2 - u_2 L_1},$$

where

B is the symbol rate, $L_1$ is the length of the first generalized ZC sequence, and $L_2$ is the length of the second generalized ZC sequence; and $x_1$ is the time domain position of the sliding correlation peak Corr1_$f_0$, $x_2$ is the time domain position of the sliding correlation peak Corr2_$f_0$_$S_0$, $x=x_2-x_1$, y is the distance that is known in advance and that is between the time domain position of the start symbol occupied by the first generalized ZC sequence in the synchronization signal and the time domain position of the start symbol occupied by the second generalized ZC sequence in the synchronization signal, $u_1$ is the root index of the first generalized ZC sequence, $u_2$ is the root index of the second generalized ZC sequence, $L_1$ is the length of the first generalized ZC sequence, and $L_2$ is the length of the second generalized ZC sequence.

With reference to the first aspect or any one of the first to the eighth possible implementations of the first aspect, in a ninth possible implementation, the first signal and the second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

According to a second aspect, an embodiment of the present invention provides a sending device, including:

a processing module, configured to determine a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi u n(n+1+2q)/L}, q \in Z, L \in Z^+, n=0,1, \ldots L-1,$$
$0<|u|<L, u \in R$, where u is a root index of the generalized ZC sequence, q is an offset index of the generalized ZC sequence, L is a length of the generalized ZC sequence, and L is a positive integer;

different cells or different cell groups correspond to different second signals; and there are at least two generalized ZC sequences in (N1+N2) generalized ZC sequences including the N1 generalized ZC sequences and the N2 generalized ZC sequences, and root indexes of the two generalized ZC sequences are different; and a sending module, configured to send the synchronization signal determined by the processing module, where the synchronization signal is used for symbol timing synchronization; and if different cells correspond to different second signals, the synchronization signal is further used to determine a cell identifier; or if different cell groups correspond to different second signals, the synchronization signal is further used to determine a cell group identifier.

With reference to the second aspect, in a first possible implementation, N1=N2=1.

With reference to the second aspect or the first possible implementation of the second aspect, in a second possible implementation, the synchronization signal is further used for carrier frequency synchronization.

With reference to the second aspect or the first or the second possible implementation of the second aspect, in a third possible implementation, the first signal and the second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

According to a third aspect, an embodiment of the present invention provides a symbol timing synchronization method, including:

receiving a synchronization signal sent by a sending device, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi u n(n+1+2q)/L}, q \in Z, L \in Z^+, n=0,1, \ldots L-1,$$
$0<|u|<L, u \in R$, where u is a root index of the generalized ZC sequence, q is an offset index of the generalized ZC sequence, L is a length of the generalized ZC sequence, and L is a positive integer;

different cells or different cell groups correspond to different second signals; and there are at least two generalized ZC sequences in (N1+N2) generalized ZC sequences including the N1 generalized ZC sequences and the N2 generalized ZC sequences, and root indexes of the two generalized ZC sequences are different;

performing a first sliding correlation operation on the received synchronization signal by using each of the locally stored N1 generalized ZC sequences;

traversing at least two groups of N2 generalized ZC sequences that are locally stored, and performing a second sliding correlation operation on the received synchronization signal by using each generalized ZC sequence in each group of N2 generalized ZC sequences; and performing symbol timing synchronization according to a result of each first sliding correlation operation and a result of each second sliding correlation operation; and if different cells correspond to different second signals, determining, according to the result of each first sliding correlation operation and the result of each second sliding correlation operation, a cell identifier of a cell in which a current receiving device is located; or if different cell groups correspond to different second signals, determining, according to the result of each first sliding correlation operation and the result of each second sliding correlation operation, a cell group identifier of a cell group in which the current receiving device is located.

With reference to the third aspect, in a first possible implementation, N1=N2=1;

the N1 generalized ZC sequence is a first generalized ZC sequence, and the N2 generalized ZC sequence is a second generalized ZC sequence;

the performing a first sliding correlation operation on the received synchronization signal includes: performing the first sliding correlation operation on the received synchronization signal by using the locally stored first generalized ZC sequence; and the traversing each of at least two groups of N2 generalized ZC sequences that are locally stored, and for each group of traversed generalized ZC sequences, performing a second sliding correlation operation on the received synchronization signal by using each generalized ZC sequence in the group of N2 generalized ZC sequences includes:

performing the second sliding correlation operation on the received synchronization signal by using each of at least two locally stored second generalized ZC sequences.

With reference to the first possible implementation of the third aspect, in a second possible implementation, before the first sliding correlation operation and the second sliding correlation operation are performed, the method further includes: determining each frequency offset $f_i$ that is in a frequency offset range of the current receiving device and that is an integer multiple of a symbol rate;

the performing the first sliding correlation operation on the received synchronization signal by using the locally stored first generalized ZC sequence includes:

for each determined frequency offset $f_i$, performing a sliding correlation operation on the received synchronization signal by using the first generalized ZC sequence, to obtain a sliding correlation peak $Corr1\_f_i$ in the frequency offset by means of calculation, where i=1, . . . , and P, i and P are positive integers, and P is a quantity of determined frequency offsets;

the performing the second sliding correlation operation on the received synchronization signal by using each of at least two locally stored second generalized ZC sequences includes:

for each determined frequency offset $f_i$, traversing each of the at least two locally stored second generalized ZC sequences; and for each traversed second generalized ZC sequence $S_j$, performing a sliding correlation operation on the received synchronization signal by using the second generalized ZC sequence, to obtain a sliding correlation peak $Corr2\_f_i\_S_j$ in the second generalized ZC sequence in the frequency offset by means of calculation, where j=1, . . . , and Q, j and Q are positive integers, and Q is a quantity of locally stored second generalized ZC sequences; and the performing symbol timing synchronization according to a result of each first sliding correlation operation and a result of each second sliding correlation operation includes:

determining, from all frequency offsets $f_i$ according to each obtained sliding correlation peak $Corr1\_f_i$ and each obtained sliding correlation peak $Corr2\_f_i\_S_j$, a frequency offset $f_0$ closest to an actual frequency offset and a second generalized ZC sequence $S_0$ that corresponds to the cell in which the current receiving device is located; and performing the symbol timing synchronization according to a time domain position of a sliding correlation peak $Corr1\_f_0$ corresponding to the determined frequency offset $f_0$, a time domain position of a sliding correlation peak $Corr2\_f_0\_S_0$ in the second generalized ZC sequence $S_0$ in the determined frequency offset $f_0$, and a distance that is known in advance and that is between a time domain position of a start symbol occupied by the first generalized ZC sequence in the synchronization signal and a time domain position of a start symbol occupied by the second generalized ZC sequence in the synchronization signal.

With reference to the second possible implementation of the third aspect, in a third possible implementation, the determining, according to the result of each first sliding correlation operation and the result of each second sliding correlation operation, a cell identifier of a cell in which a current receiving device is located includes: determining, according to a pre-stored correspondence between a cell identifier and a second generalized ZC sequence, that a cell identifier corresponding to the second generalized ZC sequence $S_0$ is the cell identifier of the cell in which the current receiving device is located; and/or the determining, according to the result of each first sliding correlation operation and the result of each second sliding correlation operation, a cell group identifier of a cell group in which the current receiving device is located includes: determining, according to a pre-stored correspondence between a cell group identifier and a second generalized ZC sequence, that a cell group identifier corresponding to the second generalized ZC sequence $S_0$ is the cell group identifier of the cell group in which the current receiving device is located.

With reference to the second or the third possible implementation of the third aspect, in a fourth possible implementation, the determining, from all frequency offsets $f_i$ according to each obtained sliding correlation peak $Corr1\_f_i$ and each obtained sliding correlation peak $Corr2\_f_i\_S_j$, a frequency offset $f_0$ closest to an actual frequency offset and a second generalized ZC sequence $S_0$ that corresponds to the cell in which the current receiving device is located includes:

determining that a frequency offset corresponding to a sliding correlation peak $Corr\_max$ is $f_0$, where $$Corr\_max = \underset{i,j}{MAX}\{Corr1\_f_i + Corr2\_f_i\_S_j\};$$

and determining that a second generalized ZC sequence corresponding to the sliding correlation peak $Corr\_max$ is $S_0$.

With reference to the second or the third possible implementation of the third aspect, in a fifth possible implementation, the determining, from all frequency offsets $f_i$ according to each obtained sliding correlation peak Corr1_$f_i$ and each obtained sliding correlation peak Corr2_$f_i$_$S_j$, a frequency offset $f_0$ closest to an actual frequency offset and a second generalized ZC sequence $S_0$ that corresponds to the cell in which the current receiving device is located includes:

if a frequency offset corresponding to a greatest sliding correlation peak in all obtained Corr1_$f_i$ is equal to a frequency offset corresponding to a greatest sliding correlation peak in all obtained Corr2_$f_i$_$S_j$, determining that $f_0$ is the corresponding frequency offset, and determining that a second generalized ZC sequence corresponding to a greatest sliding correlation peak in all Corr2_$f_0$_$S_j$ is $S_0$.

With reference to any one of the second to the fifth possible implementations of the third aspect, in a sixth possible implementation, the first generalized ZC sequence is before the second generalized ZC sequence in a time domain; and the symbol timing synchronization includes:

determining that the position $pos_1$ of the start symbol occupied by the first generalized ZC sequence is:

$$pos_1 = x_1 - \frac{L_1 u_2(x-y)}{u_1 L_2 - u_2 L_1},$$

where $x_1$ is the time domain position of the sliding correlation peak Corr1_$f_0$, $x_2$ is the time domain position of the sliding correlation peak Corr2_$f_0$_$S_0$, $x=x_2-x_1$, y is the distance that is known in advance and that is between the time domain position of the start point of the first generalized ZC sequence in the synchronization signal and the time domain position of the start point of the second generalized ZC sequence in the synchronization signal, $u_1$ is a root index of the first generalized ZC sequence, $u_2$ is a root index of the second generalized ZC sequence, $L_1$ is a length of the first generalized ZC sequence, and $L_2$ is a length of the second generalized ZC sequence;

determining a position of each symbol in the received signal according to the determined position of the start symbol occupied by the first generalized ZC sequence and a symbol length that is known in advance; and performing at least one of the following three operations:

determining a frame start position in the received signal according to a relative position that is known in advance and that is of the first generalized ZC sequence in a frame;

determining a subframe start position in the received signal according to a relative position that is known in advance and that is of the first generalized ZC sequence in a subframe; or determining a timeslot start position in the received signal according to a relative position that is known in advance and that is of the first generalized ZC sequence in a timeslot.

With reference to any one of the second to the sixth possible implementations of the third aspect, in a seventh possible implementation, after the determining, from all frequency offsets $f_i$, a frequency offset $f_0$ closest to an actual frequency offset, the method further includes:

determining the actual frequency offset F according to the time domain position of the sliding correlation peak Corr1_$f_0$ in the frequency offset $f_0$, the time domain position of the sliding correlation peak Corr2_$f_0$_$S_0$ in the second generalized ZC sequence in the frequency offset $f_0$, the distance that is known in advance and that is between the time domain position of the start symbol occupied by the first generalized ZC sequence in the synchronization signal and the time domain position of the start symbol occupied by the second generalized ZC sequence in the synchronization signal, and the frequency offset $f_0$.

With reference to the seventh possible implementation of the third aspect, in an eighth possible implementation, $$F = f_0 + \frac{B u_1 u_2 (x-y)}{u_1 L_2 - u_2 L_1},$$

where

B is the symbol rate, $L_1$ is the length of the first generalized ZC sequence, and $L_2$ is the length of the second generalized ZC sequence; and $x_1$ is the time domain position of the sliding correlation peak Corr1_$f_0$, $x_2$ is the time domain position of the sliding correlation peak Corr2_$f_0$_$S_0$, $x=x_2-x_1$, y is the distance that is known in advance and that is between the time domain position of the start symbol occupied by the first generalized ZC sequence in the synchronization signal and the time domain position of the start symbol occupied by the second generalized ZC sequence in the synchronization signal, $u_1$ is the root index of the first generalized ZC sequence, $u_2$ is the root index of the second generalized ZC sequence, $L_1$ is the length of the first generalized ZC sequence, and $L_2$ is the length of the second generalized ZC sequence.

With reference to the third aspect or any one of the first to the eighth possible implementations of the third aspect, in a ninth possible implementation, the first signal and the second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

According to a fourth aspect, an embodiment of the present invention provides a symbol timing synchronization method, including:

determining a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$ZC(n)=e^{-j\pi un(n+1+2q)/L}, q \in Z, L \in Z^+, n=0,1, \ldots L-1,$
$0<|u|<L, u \in R$, where u is a root index of the generalized ZC sequence, q is an offset index of the generalized ZC sequence, L is a length of the generalized ZC sequence, and L is a positive integer;

different cells or different cell groups correspond to different second signals; and there are at least two generalized ZC sequences in (N1+N2) generalized ZC sequences including the N1 generalized ZC sequences and the N2 generalized ZC sequences, and root indexes of the two generalized ZC sequences are different; and sending the determined synchronization signal, where the synchronization signal is used for symbol timing synchronization; and if different cells correspond to different second signals, the synchronization signal is further used to determine a cell identifier; or if different cell groups correspond to different second signals, the synchronization signal is further used to determine a cell group identifier.

With reference to the fourth aspect, in a first possible implementation, N1=N2=1.

With reference to the fourth aspect or the first possible implementation of the fourth aspect, in a second possible implementation, the synchronization signal is further used for carrier frequency synchronization.

With reference to the fourth aspect or the first or the second possible implementation of the fourth aspect, in a third possible implementation, the first signal and the second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

According to a fifth aspect, an embodiment of the present invention provides a wireless communications system, including a sending device and a receiving device, where the sending device is configured to send a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi un(n+1+2q)/L}, q \in Z, L \in Z^+, n=0,1, \ldots L-1,$$
$$0<|u|<L, u \in R, \text{ where}$$

u is a root index of the generalized ZC sequence, q is an offset index of the generalized ZC sequence, L is a length of the generalized ZC sequence, and L is a positive integer;

different cells or different cell groups correspond to different second signals; and there are at least two generalized ZC sequences in (N1+N2) generalized ZC sequences including the N1 generalized ZC sequences and the N2 generalized ZC sequences, and root indexes of the two generalized ZC sequences are different; and the receiving device is configured to:

receive the synchronization signal;

perform a first sliding correlation operation on the received synchronization signal by using each of the locally stored N1 generalized ZC sequences;

traverse at least two groups of N2 generalized ZC sequences that are locally stored, and perform a second sliding correlation operation on the received synchronization signal by using each generalized ZC sequence in each group of N2 generalized ZC sequences; and perform symbol timing synchronization according to a result of each first sliding correlation operation and a result of each second sliding correlation operation; and if different cells correspond to different second signals, determine, according to the result of each first sliding correlation operation and the result of each second sliding correlation operation, a cell identifier of a cell in which the current receiving device is located; or if different cell groups correspond to different second signals, determine, according to the result of each first sliding correlation operation and the result of each second sliding correlation operation, a cell group identifier of a cell group in which the current receiving device is located.

Because the synchronization signal in the foregoing form is used, the receiving device may perform the symbol timing synchronization according to a relationship between a sliding correlation peak generated when a sliding correlation is performed on the N1 generalized ZC sequences and a sliding correlation peak generated when a sliding correlation is performed on the N2 generalized ZC sequences. This has relatively low implementation complexity, compared with an existing method in which a low-cost M2M terminal or the like needs to perform grid search multiple times to compensate for a relatively large phase rotation.

In addition, an optional range of a synchronization sequence is relatively small in a relatively large frequency offset. Therefore, design of a synchronization signal between multiple cells needs to be reconsidered, so that synchronization performance of the synchronization signal in the relatively large frequency offset meets a requirement, and interference can be effectively resisted in a co-channel interference (from another cell) case.

In the embodiments of the present invention, the receiving device may further determine, according to a result of each sliding correlation operation, a cell identifier of a cell in which the receiving device is located, or a cell group identifier of a cell group in which the receiving device is located. Therefore, the synchronization signal resists interference in the relatively large frequency offset. For example, in a single-frequency network of different cells, the synchronization signal can effectively resist inter-cell interference in the relatively large frequency offset.

Further, the receiving device may perform, according to the result of the sliding correlation operation, carrier frequency synchronization, that is, frequency offset estimation.

DESCRIPTION OF EMBODIMENTS

Figure 1:
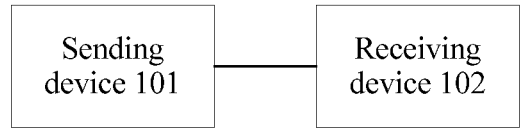
FIG. 1 is a schematic structural diagram of a wireless communications system according to an embodiment of the present invention.

Embodiments of the present invention provide a signal sending device, a signal receiving device, a symbol timing synchronization method, and a system, to resolve a problem that implementation complexity of symbol timing synchronization is high because a terminal with relatively low crystal oscillator accuracy has a relatively large frequency offset.

In the embodiments of the present invention, the sending device sends a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi un(n+1+2q)/L}, q \in Z, L \in Z^+, n=0,1,\ldots L-1,$$
$$0<|u|<L, u \in R$$

Root indexes, offset indexes, and lengths of all generalized ZC sequences in the first signal may be the same, or may be different, and different cells correspond to the same first signal. Root indexes, offset indexes, and lengths of all generalized ZC sequences in the second signal may be the same, or may be different, and different cells or different cell groups correspond to different second signals. There are at least two generalized ZC sequences in (N1+N2) generalized ZC sequences including the N1 generalized ZC sequences and the N2 generalized ZC sequences, and root indexes of the two generalized ZC sequences are different.

Because the synchronization signal in the foregoing form is used, the receiving device may perform the symbol timing synchronization according to a relationship between a sliding correlation peak generated when a sliding correlation is performed on the N1 generalized ZC sequences and a sliding correlation peak generated when a sliding correlation is performed on the N2 generalized ZC sequences. This has relatively low implementation complexity, compared with an existing method in which a low-cost M2M terminal or the like needs to perform grid search multiple times to compensate for a relatively large phase rotation.

In addition, an optional range of a synchronization sequence is relatively small in a relatively large frequency offset. Therefore, design of a synchronization signal between multiple cells needs to be reconsidered, so that synchronization performance of the synchronization signal in the relatively large frequency offset meets a requirement, and interference can be effectively resisted in a co-channel interference (from another cell) case.

In the embodiments of the present invention, the receiving device may further determine, according to a result of each sliding correlation operation, a cell identifier of a cell in which the receiving device is located, or a cell group identifier of a cell group in which the receiving device is located. Therefore, the synchronization signal resists interference in the relatively large frequency offset. For example, in a single-frequency network of different cells, the synchronization signal can effectively resist inter-cell interference in the relatively large frequency offset.

Further, the receiving device may perform, according to the result of the sliding correlation operation, carrier frequency synchronization, that is, frequency offset estimation.

The following describes the embodiments of the present invention in detail with reference to accompanying drawings.

First, the wireless communications system provided in the embodiments of the present invention is described. Then, the sending device and the receiving device provided in the embodiments of the present invention are separately described. Finally, the symbol timing synchronization method provided in the embodiments of the present invention is described.

FIG. 1 is a schematic structural diagram of a wireless communications system according to an embodiment of the present invention. As shown in FIG. 1, the wireless communications system includes a sending device 101 and a receiving device 102.

The sending device 101 is configured to send a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi un(n+1+2q)/L}, q \in Z, L \in Z^+, n=0,1,\ldots L-1,$$
$$0<|u|<L, u \in R, \text{ where}$$

u is a root index of the generalized ZC sequence, q is an offset index of the generalized ZC sequence, L is a length of the generalized ZC sequence, and $L \in Z^+$ indicates that L is a positive integer.

Root indexes, offset indexes, and lengths of all generalized ZC sequences in the first signal may be the same, or may be different, and different cells correspond to the same first signal. Root indexes, offset indexes, and lengths of all generalized ZC sequences in the second signal may be the same, or may be different, and different cells or different cell groups correspond to different second signals. There are at least two generalized ZC sequences in (N1+N2) generalized ZC sequences including the N1 generalized ZC sequences and the N2 generalized ZC sequences, and root indexes of the two generalized ZC sequences are different.

The receiving device 102 is configured to: receive the foregoing synchronization signal sent by the sending device 101; perform a first sliding correlation operation on the received synchronization signal by using each of the locally stored N1 generalized ZC sequences; traverse each of at least two groups of N2 generalized ZC sequences that are locally stored, and for each group of N2 generalized ZC sequences that are traversed, perform a second sliding correlation operation on the received synchronization signal by using each generalized ZC sequence in the group of N2 generalized ZC sequences; perform symbol timing synchronization according to a result of each first sliding correlation operation and a result of each second sliding correlation operation; and if different cells correspond to different second signals, determine, according to the result of each first sliding correlation operation and the result of each second sliding correlation operation, a cell identifier of a cell in which the receiving device is located; or if different cell groups correspond to different second signals, determine, according to the result of each first sliding correlation operation and the result of each second sliding correlation operation, a cell group identifier of a cell group in which the receiving device is located.

A reason of the foregoing mentioned "there are at least two generalized ZC sequences in (N1+N2) generalized ZC sequences including the N1 generalized ZC sequences and the N2 generalized ZC sequences, and root indexes of the two generalized ZC sequences are different" is: As long as all generalized ZC sequences include at least two sequences with different root indexes, when a sliding correlation is performed, the symbol timing synchronization can be completed by using a position relationship between sliding correlation peaks separately generated by the two sequences with different root indexes. Otherwise, if root indexes of all generalized ZC sequences are the same, when a sliding correlation is performed, all offsets of sliding correlation peaks of all the generalized ZC sequences are the same relative to start positions of the generalized ZC sequences. In this case, the receiving device cannot know a symbol position. Consequently, the symbol timing synchronization cannot be implemented.

A communications standard of the wireless communications system provided in this embodiment of the present invention includes but is not limited to: Global System for Mobile Communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), time division duplex-Long Term Evolution (TDD LTE), frequency-division duplex Long Term Evolution (FDD LTE), Long Term Evolution Advanced (LTE-advanced), a personal handy-phone system (PHS), Wireless Fidelity (WiFi) specified in 802.11 family of protocols, Worldwide Interoperability for Microwave Access (WiMAX), and the like.

The sending device 101 may be a terminal or a base station. When the sending device 101 is a terminal, the receiving device 102 may be a base station; or when the sending device 101 is a base station, the receiving device 102 may be a terminal.

The terminal may include but is not limited to a mobile phone, a tablet computer, a personal digital assistant (PDA), a point of sale (POS), a vehicle-mounted computer, a water meter, an electricity meter, a gas meter, and the like.

In addition, the base station may further include a radio resource management device configured to control the base station, or the like. The terminal is a terminal device that communicates with the base station, including user equipment, a relay node, or the like.

For example, for an LTE system such as a TDD LTE system, an FDD LTE system, or an LTE-A system, the base station may be an evolved NodeB (eNodeB), and the terminal may be UE. For a TD-SCDMA system or a WCDMA system, the base station may include a NodeB (NodeB), or include a NodeB and a radio network controller (RNC), and the terminal may be UE. For a GSM system, the base station may include a base transceiver station (BTS), or include a BTS and a base station controller (BSC), and the terminal is a mobile station (MS). For a WiFi system, the base station may include an access point (AP) and/or an access controller (AC), and the terminal may be a station (STAtion, STA).

In a conventional definition, a ZC (Zadoff-Chu) sequence is defined as the following formula:

$$ZC(n)=e^{-j\pi u n(n+1+2q)/L}, q \in Z, L \in Z^+, n=0,1, \ldots L-1,$$
$$0<|u|<L, u \in R, \text{ where}$$

u is a root index of the ZC sequence $0<u<L, u \in Z, \gcd(u,L)=1$, gcd (Greatest Common Divisor) indicates a greatest common divisor operation, and $\gcd(u,L)=1$ indicates that u is coprime to L.

This embodiment of the present invention provides a generalized ZC sequence. Compared with a conventional generalized ZC sequence, an expression structure of the generalized ZC sequence does not change, but a root index u of the generalized ZC sequence only needs to meet $-L<u<L, u \neq 0, u \in R$, that is, a value range of u is extended from a positive integer to a real number, and a condition that u is coprime to L is not required.

As described above, the root indexes, offset indexes, and lengths of all the generalized ZC sequences in the second signal may be the same, or may be different, and different cells or different cell groups correspond to different second signals.

For example, the second signal includes two generalized ZC sequences, and root indexes, offset indexes, and lengths of the two generalized ZC sequences may be the same, or may be different.

For a cell 1, both root indexes of two generalized ZC sequences included in a second signal are $u_a$, both offset indexes are $p_a$, and both lengths are $L_a$. For a cell 2, both root indexes of two generalized ZC sequences included in a second signal are $u_b$, both offset indexes are $p_b$, and both lengths are $L_b$. Therefore, the cell 1 and the cell 2 correspond to different second signals.

For another example, for a cell 1, both offset indexes of two generalized ZC sequences included in a second signal are $p_a$; and for a cell 2, both offset indexes of two generalized ZC sequences included in a second signal are $p_b$. The cell 1 and the cell 2 correspond to different second signals, because an offset index of a generalized ZC sequence in the second signal of the cell 1 is different from that of a generalized ZC sequence in the second signal of the cell 2.

For another example, for a cell 1, both offset indexes of two generalized ZC sequences included in a second signal are respectively $p_a$ and $p_b$; and for a cell 2, both offset indexes of two generalized ZC sequences included in a second signal are respectively $p_c$ and $p_d$. The cell 1 and the cell 2 correspond to different second signals, because an offset index of a generalized ZC sequence in the second signal of the cell 1 is different from that of a generalized ZC sequence in the second signal of the cell 2.

For another example, the second signal includes only one generalized ZC sequence. For a cell 1, a root index of a generalized ZC sequence in a second signal is $u_a$; and for a cell 2, a root index of a generalized ZC sequence in a second signal is $u_b$. The cell 1 and the cell 2 correspond to different second signals, because the root index of the generalized ZC sequence in the second signal of the cell 1 is different from that of the generalized ZC sequence in the second signal of the cell 2.

There are many similar examples, which are not enumerated herein. It is considered that different cells correspond to different second signals as long as any one or more of root indexes, offset indexes, or lengths of all generalized ZC sequences in the second signals are different for the different cells.

Likewise, in a case in which different cell groups correspond to different second signals, it is considered that different cell groups correspond to different second signals as long as any one or more of root indexes, offset indexes, or lengths in the second signals are different for the different cell groups.

The different cells herein are generally geographically neighboring or proximate cells, and not all different cells correspond to different second signals. For example, in a cellular mobile communications system, as long as a geographic distance between two cells is large enough, it may be approximately considered that interference between the two cells is excessively small. In this case, the two cells may correspond to a same second signal.

Likewise, the different cell groups herein are generally geographically neighboring or proximate cell groups, and not all different cell groups correspond to different second signals. For example, in a cellular mobile communications system, as res://XDict.exe/word.html-##long as a geographic distance between two cell groups is large enough, it may be approximately considered that interference between the two cell groups is excessively small. In this case, the two cell groups may correspond to a same second signal.

Optionally, a generalized ZC sequence in the first signal and the second signal may be any cyclic shift sequence in the generalized ZC sequence defined by using the foregoing formula $ZC(n)=e^{-j\pi un(n+1+2q)/L}$, $q \in Z, L \in Z^+, n=0, 1, \ldots L-1$, $0<|u|<L, u \in R$.

Optionally, a generalized ZC sequence in the first signal and the second signal may be a sequence obtained after the generalized ZC sequence defined in the foregoing formula is multiplied by any another sequence such as a pseudo random sequence, a ZC sequence, or a gold sequence.

The generalized ZC sequence in the first signal and/or the second signal, multiplied by the another sequence, may be used to distinguish different cells, receiving devices, frame numbers, timeslot numbers, and the like. The another sequence is not limited to the pseudo random sequence, the ZC sequence, or the gold sequence, and may be any sequence with a cross-correlation. If the first signal or the second signal sent by the sending device 101 is a generalized ZC sequence that is multiplied by another sequence, before performing processing in a processing manner in this embodiment of the present invention, the receiving device 102 first multiplies a received signal by a conjugate sequence of the another sequence, so as to recover the generalized ZC sequence in the first signal or the second signal. Optionally, a correlation operation may be performed in the following manner.

It is assumed that there are a sequence $\{j_i\}_{1 \le i \le m}$ and a sequence $\{l_i\}_{1 \le i \le m}$. A correlation operation of the sequence j and the sequence l and a correlation value obtained by means of the correlation operation are:

$$\text{correlation\_value} = CORR(j, l) = \left\| \sum_{i=1}^{m} \overline{j_i} l_i \right\|^2,$$

where

CORR is defined as a correlation operation operator, and correlation_value is an operation result of CORR(j,l), where CORR indicates a correlation operation, $\|\ \|$ indicates a modulo operation, $\overline{j_i}$ indicates a conjugate operation of $j_i$, and $$\sum_{i=1}^{m}$$

indicates summation.

It is assumed that there are a sequence $\{j_i\}_{1 \le i \le m}$ and a sequence $\{l_i\}_{1 \le i \le p}$, and p>m. A sliding correlation is performed on the sequence l by using the sequence j, so that (p−m+1) correlation values can be obtained, and are denoted as correlation_value$_1$, correlation_value$_2$, . . . , correlation_value$_{p-m+1}$.

correlation_value=CORR(j,l(i:i+m−1)), 1≤i≤p−m+1, where l(i:i+m−1) indicates a sub-sequence that includes an $i^{th}$ element to an $(i+m-1)^{th}$ element of the sequence l. A sliding correlation operator CORR_SLIDE(j,l) of the sequence j and the sequence l is defined, and a sliding correlation peak value of the sequence j and the sequence l is:

$$\text{correlation\_slide\_value} = CORR\_SLIDE(j, l) = \max_i(\text{correlation\_value}_i) = \max_i(CORR(j, l(i: i+m-1))).$$

Figure 2A:
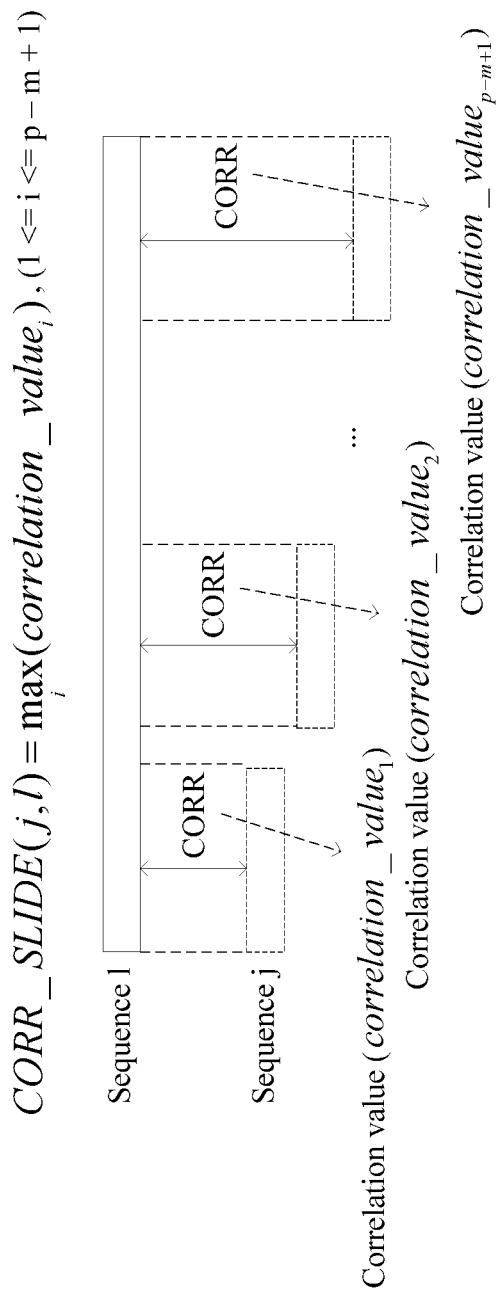
FIG. 2A is a schematic diagram of a sliding correlation process of two sequences.

A sliding correlation process of the sequence j and the sequence l is shown in FIG. 2A.

Therefore, a sliding correlation is performed on the sequence $\{l_i\}_{1 \le i \le p}$ by using the sequence $\{j_i\}_{1 \le i \le m}$, and an obtained sliding correlation peak value is CORR_SLIDE(j, l).

By means of a great deal of research and emulation work, it is found that in this embodiment of the present invention, a generalized ZC sequence whose root index is u has the following features:

When u<=2, if a frequency offset of the generalized ZC sequence that is received by the receiving device 102 and sent by the sending device 101 is f, and a symbol rate is B, and when the receiving device 102 performs, by using the locally stored generalized ZC sequence, a sliding correlation operation on the received generalized ZC sequence affected by the frequency offset f, a position pos of a sliding correlation peak is:

$$pos = \frac{f}{uB}L,$$

where

L is a length of the generalized ZC sequence, and u is a root index of the generalized ZC sequence. When pos is positive, it indicates that the position of the sliding correlation peak is on a right side of a start point of the generalized ZC sequence (it is assumed that sequences are arranged from left to right in a time domain, the same below); or when pos is negative, it indicates that the position of the sliding correlation peak is on a left side of a sequence start point. A value of pos indicates a distance in which the sliding correlation peak deviates from the sequence start point, that is, a quantity of sequence elements between the sliding correlation peak position and the sequence start point.

Figure 2B:
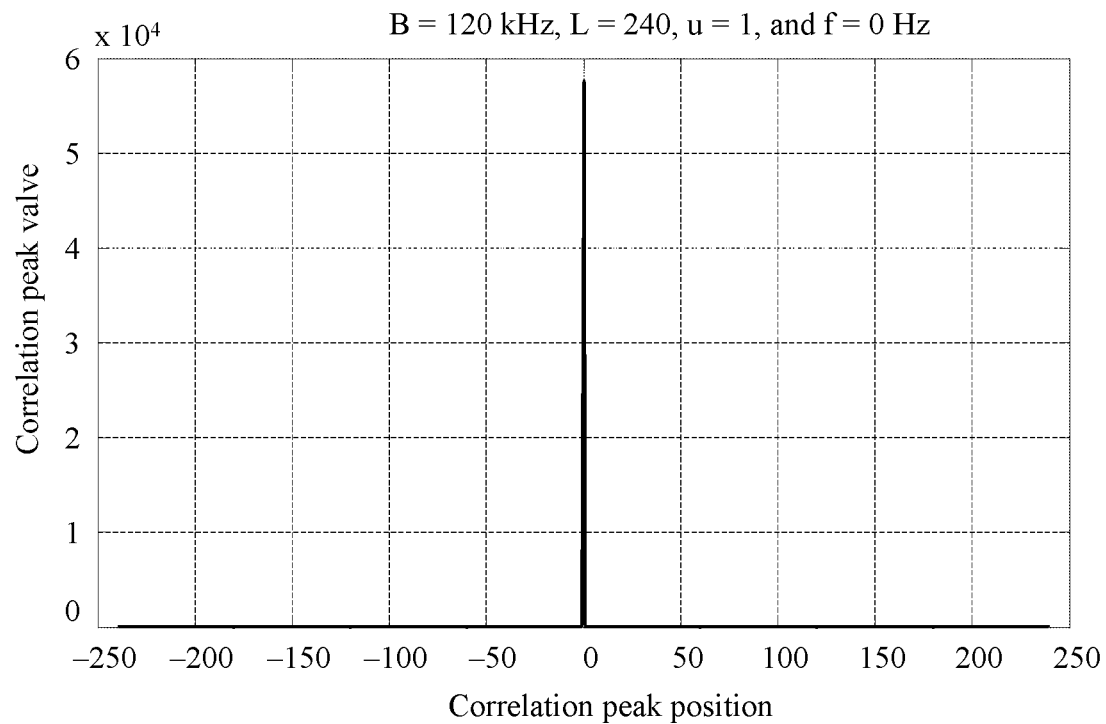
FIG. 2B to FIG. 2H are schematic diagrams of a sliding correlation peak in different frequency offsets.

For example, as shown in FIG. 2B, B=120 kHz, L=240, u=1, f=0 Hz, and a horizontal coordinate 0 in the figure indicates a sequence start point. In this case, $$pos = \frac{f}{uB}L = 0.$$

Figure 2C:
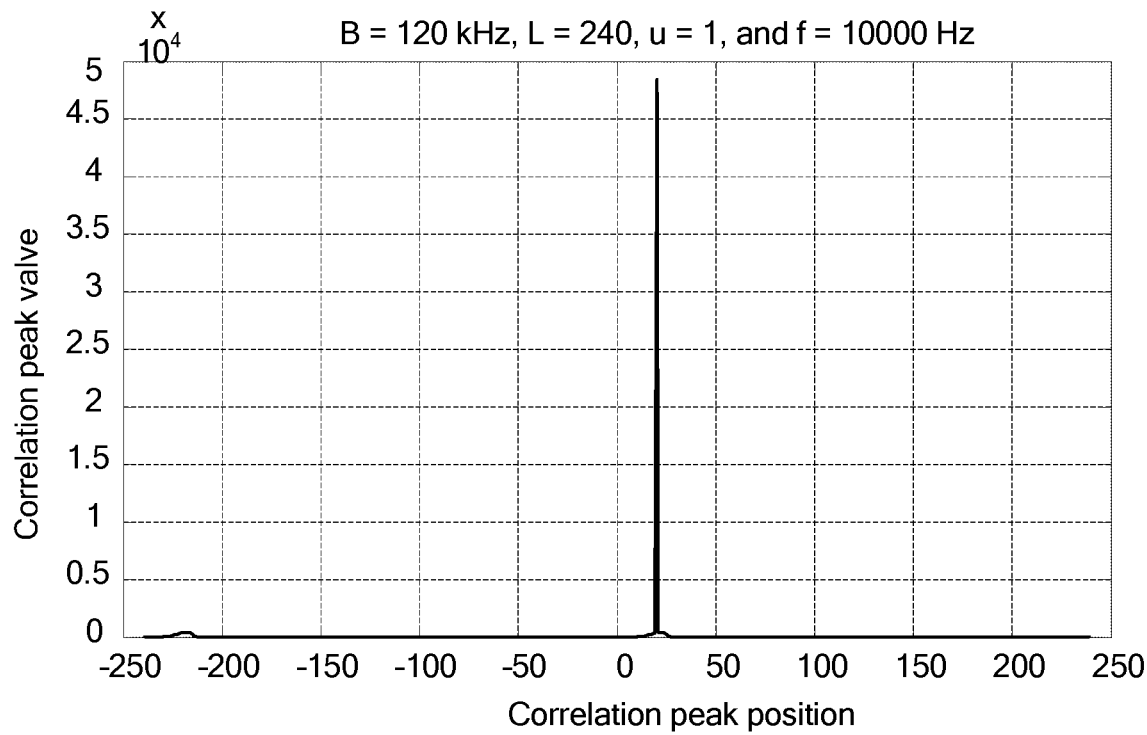

For another example, as shown in FIG. 2C, B=120 kHz, L=240, u=1, f=10 kHz, and a horizontal coordinate 0 in the figure indicates a sequence start point. In this case, $$pos = \frac{f}{uB}L = 20.$$

Figure 2D:
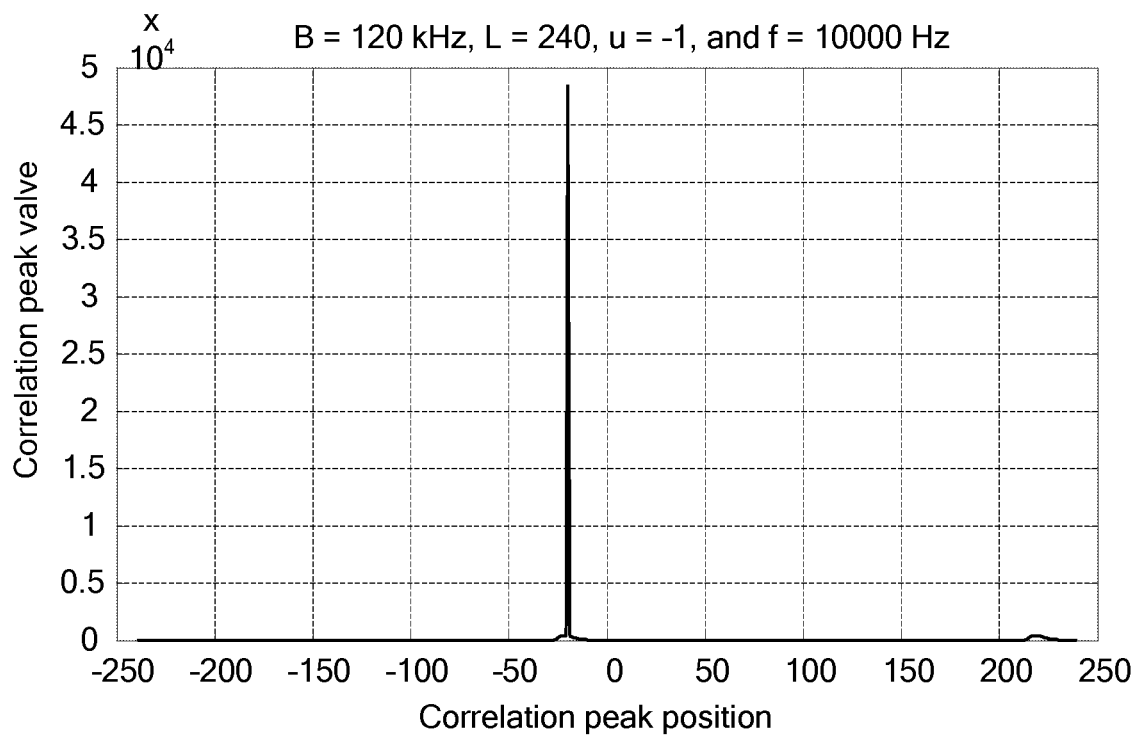

For another example, as shown in FIG. 2D, B=120 kHz, L=240, u=1, f=10 kHz, and a horizontal coordinate 0 in the figure indicates a sequence start point. In this case, $$pos = \frac{f}{uB}L = -20.$$

Figure 2E:
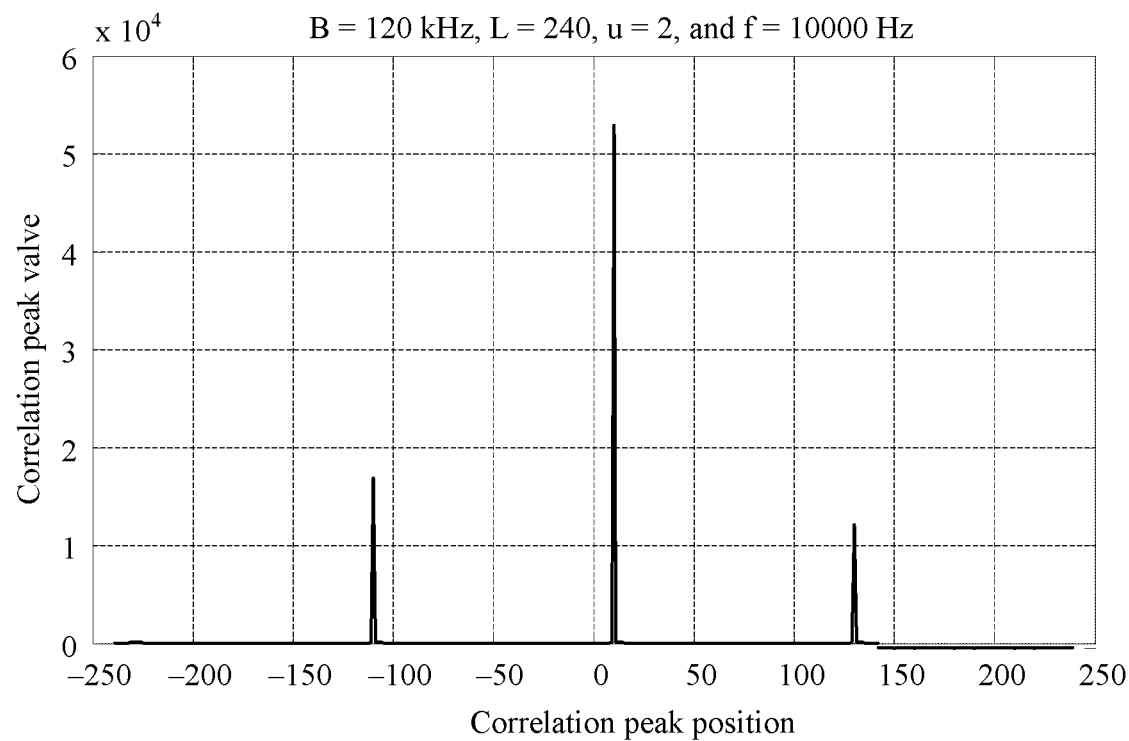

For another example, as shown in FIG. 2E, B=120 kHz, L=240, u=2, f=10 kHz, and a horizontal coordinate 0 in the figure indicates a sequence start point. In this case, $$pos = \frac{f}{uB}L = 10.$$

Figure 2F:
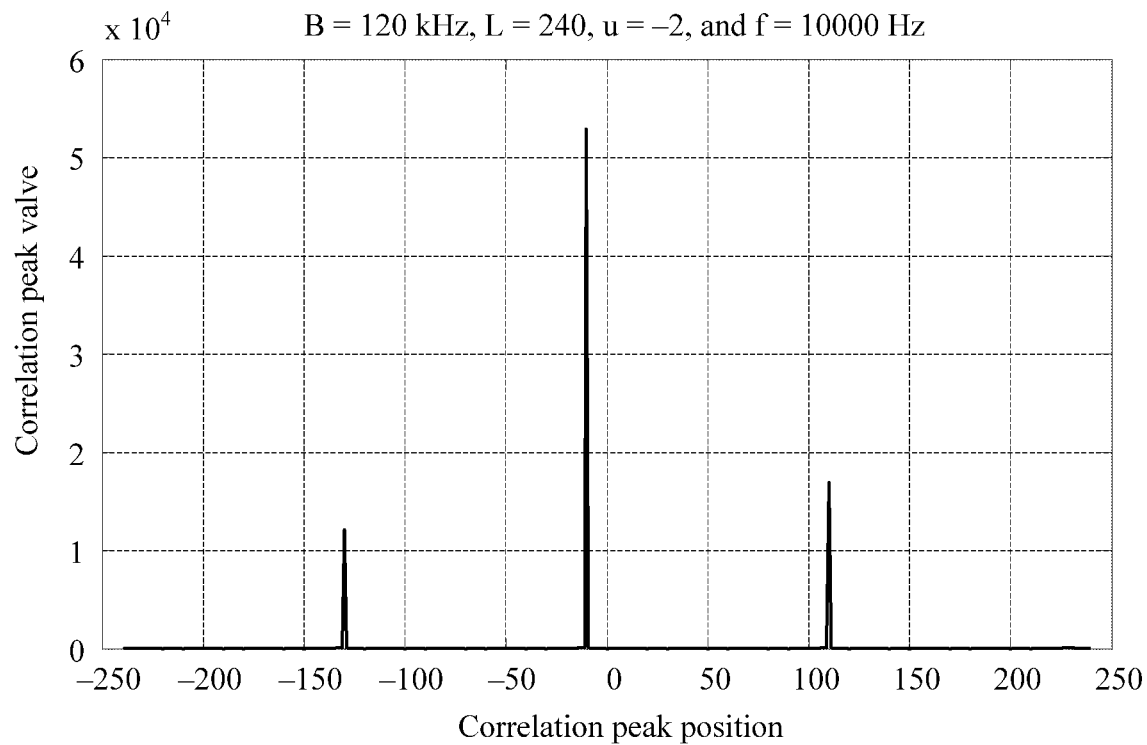
Figure 2G:
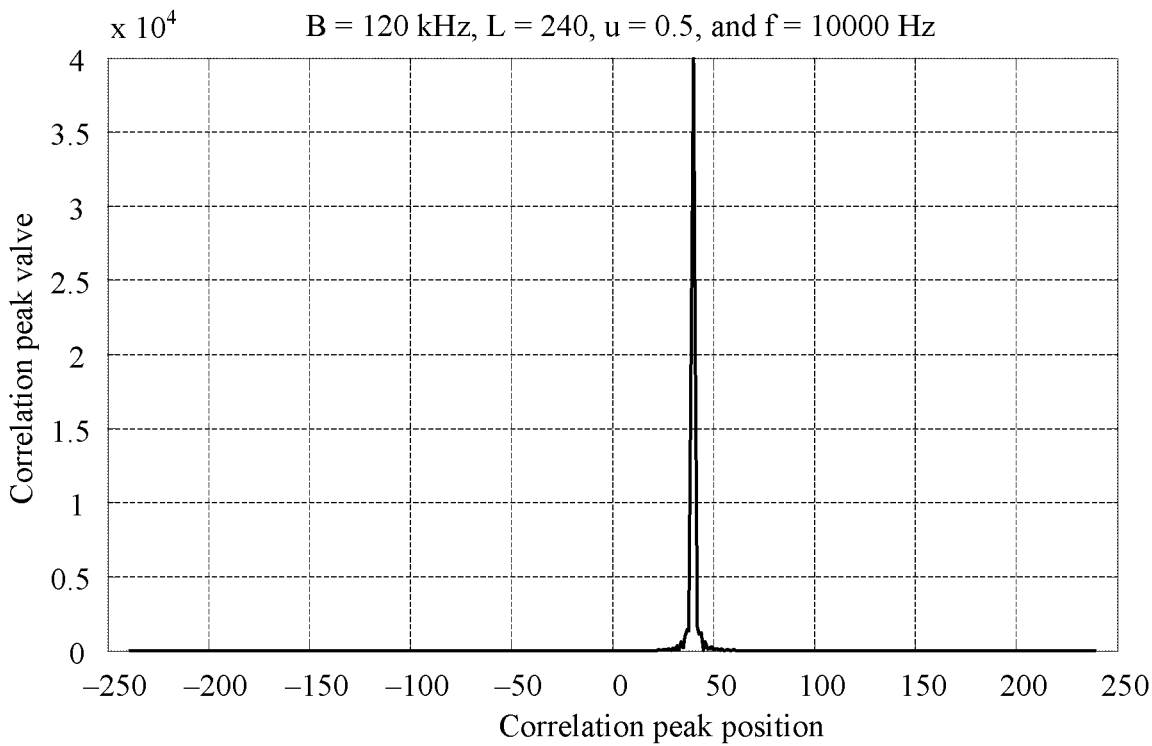

For another example, as shown in FIG. 2F, B=120 kHz, L=240, u=2, f=10 kHz, and a horizontal coordinate 0 in the figure indicates a sequence start point. In this case, $$pos = \frac{f}{uB}L = -10.$$

For another example, as shown in FIG. 2Q B=120 kHz, L=240, u=0.5, f=10 kHz, and a horizontal coordinate 0 in the figure indicates a sequence start point. In this case, $$pos = \frac{f}{uB}L = 40.$$

Figure 2H:
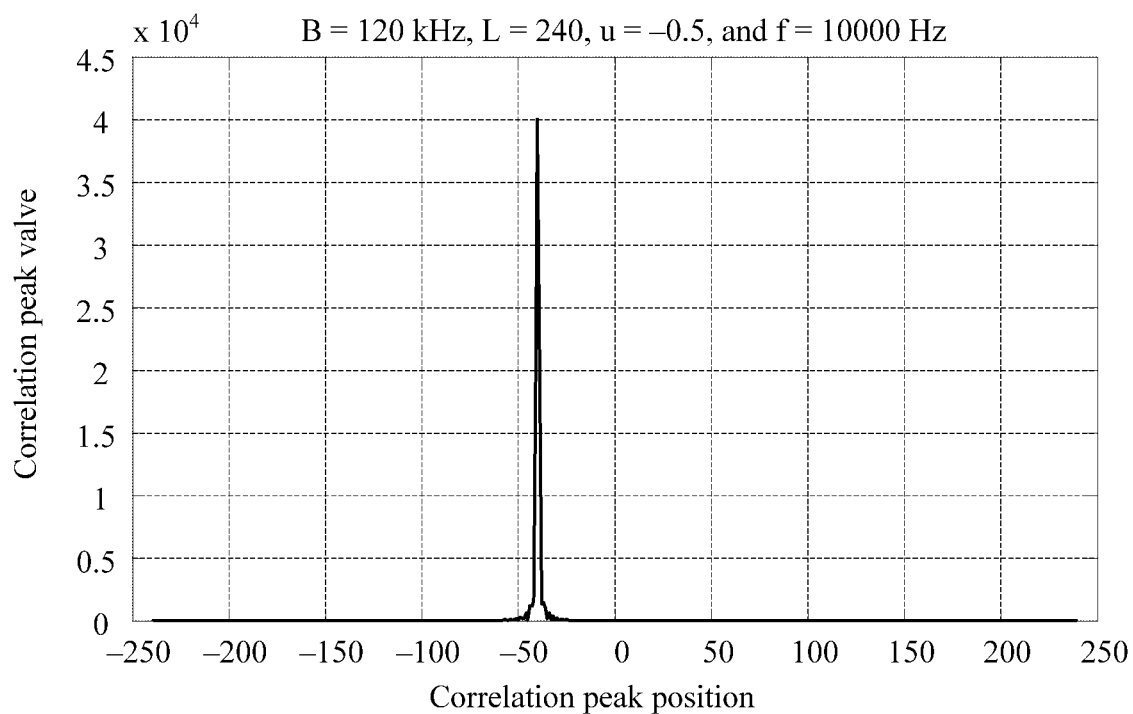

For another example, as shown in FIG. 2H, B=120 kHz, L=240, u=0.5, f=10 kHz, and a horizontal coordinate 0 in the figure indicates a sequence start point. In this case, $$pos = \frac{f}{uB}L = -40.$$

Optionally, N1=N2=1.

In this case, the foregoing N1 generalized ZC sequence may be referred to as a "first generalized ZC sequence", and the foregoing N2 generalized ZC sequence may be referred to as a "second generalized ZC sequence".

When performing the first sliding correlation operation on the received synchronization signal, the receiving device 102 may perform the first sliding correlation operation on the received synchronization signal by using the locally stored first generalized ZC sequence.

When traversing each of the at least two groups of N2 generalized ZC sequences that are locally stored, and for each group of traversed generalized ZC sequences, performing the second sliding correlation operation on the received synchronization signal by using each generalized ZC sequence in the group of N2 generalized ZC sequences, the receiving device 102 may perform the second sliding correlation operation on the received synchronization signal by using each of at least two locally stored second generalized ZC sequences.

Figure 3:
FIG. 3 is a schematic diagram of sending a first signal and a second signal.

As shown in FIG. 3, if the foregoing first generalized ZC sequence included in the first signal and the foregoing second generalized ZC sequence included in the second signal are successively sent in a time domain when the sending device 101 sends the first signal and the second signal, when performing a sliding correlation on the received synchronization signal by separately using the locally pre-stored first generalized ZC sequence and second generalized ZC sequence, the receiving device 102 separately obtains a sliding correlation peak, and obtains two sliding correlation peaks in total. The two sliding correlation peaks may be in two cases shown in FIG. 4A and FIG. 4B.

Figure 4A:
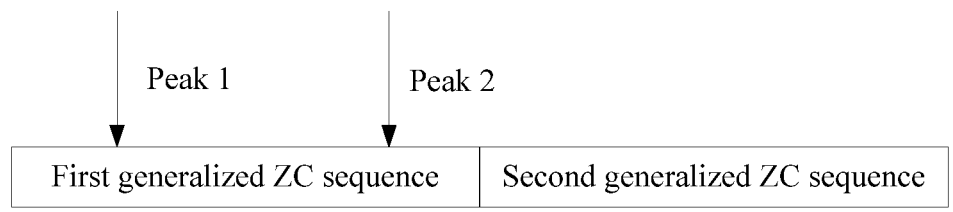
FIG. 4A is a schematic diagram of a sliding correlation peak generated when a sliding correlation is performed on a first generalized ZC sequence.
Figure 4B:
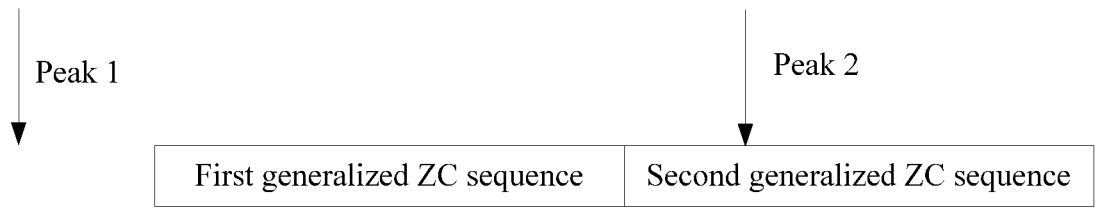
FIG. 4B is a schematic diagram of a sliding correlation peak generated when a sliding correlation is performed on a second generalized ZC sequence.

For example, root indexes of the first generalized ZC sequence and the second generalized ZC sequence are opposite numbers. For example, a root index of the first generalized ZC sequence is 1, and a root index of the second generalized ZC sequence is 1. According to the position $$pos = \frac{f}{uB}L$$

of the sliding correlation peak, sliding correlation peaks generated when a sliding correlation is performed on the two generalized ZC sequences may be shown in FIG. 4A and FIG. 4B.

In a case shown in FIG. 4A, for the first generalized ZC sequence, the sliding correlation peak is on a right side of a start point of the first generalized ZC sequence in a time domain; and for the second generalized ZC sequence, the sliding correlation peak is on a left side of a start point of the second generalized ZC sequence in a time domain.

In a case shown in FIG. 4B, for the first generalized ZC sequence, the sliding correlation peak is on a left side of a start point of the first generalized ZC sequence in a time domain; and for the second generalized ZC sequence, the sliding correlation peak is on a right side of a start point of the second generalized ZC sequence in a time domain.

For the two cases shown in FIG. 4A and FIG. 4B, a direction in which the sliding correlation peak of the first generalized ZC sequence deviates from the start point of the first generalized ZC sequence is opposite to a direction in which the sliding correlation peak of the second generalized ZC sequence deviates from the start point of the second generalized ZC sequence. However, a distance in which the sliding correlation peak of the first generalized ZC sequence deviates is the same as a distance in which the sliding correlation peak of the second generalized ZC sequence deviates.

In a synchronization process (that is, a process of performing a sliding correlation operation on the received synchronization signal by using the locally stored first generalized ZC sequence, and performing a sliding correlation operation on the received synchronization signal by selecting one of the at least two locally stored second generalized ZC sequences), the receiving device 102 performs a sliding correlation on the received synchronization signal by separately using the locally stored first generalized ZC sequence and one of the at least two locally stored second generalized ZC sequences, and separately obtains one sliding correlation peak (for the first generalized ZC sequence, the sliding correlation peak is Corr1; and for the second generalized ZC sequence, the sliding correlation peak is Corr2), and relative positions of the two sliding correlation peaks can only be one of the two cases shown in FIG. 4A and FIG. 4B.

For example, the relative positions of the two sliding correlation peaks are the case shown in FIG. 4A. It is assumed that time domain positions of the two sliding correlation peaks are respectively $x_1$ and $x_2$ ($x_1$ and $x_2$ may be sampling point numbers, that is, the receiving device 102 may perform periodic sampling, for example, perform sampling M times in one symbol, where M is a positive integer), and $x=x_2-x_1$, the receiving device 102 knows, in advance, a distance between a time domain position of a start symbol occupied by the first generalized ZC sequence and a time domain position of a start symbol occupied by the second generalized ZC sequence. Assuming that the distance is y, $u_1$ is a root index of the first generalized ZC sequence, $u_2$ is a root index of the second generalized ZC sequence, $L_1$ is a length of the first generalized ZC sequence, and $L_2$ is a length of the second generalized ZC sequence, the receiving device 102 may determine:

The position $pos_1$ of the start symbol occupied by the first generalized ZC sequence is:

$$pos_1 = x_1 - \frac{L_1 u_2 (x-y)}{u_1 L_2 - u_2 L_1};$$

and the position $pos_2$ of the start symbol occupied by the second generalized ZC sequence is:

$$pos_2 = x_2 - \frac{L_2 u_1 (x-y)}{u_1 L_2 - u_2 L_1}.$$

Optionally, a symbol start position may be determined according to $pos_1$ and/or $pos_2$. For example, there are multiple sampling points in one symbol, referred to as sampling points for short, and one sampling point in the symbol is determined as the symbol start position. Optionally, the sampling point may be a sampling point with greatest energy in all sampling points of the symbol, and may be referred to as an "optimal sampling point", that is, symbol timing synchronization is obtained.

For example, the position $pos_1$ is determined as the symbol start position. In this case, optionally, there is no need to determine $pos_2$.

Alternatively, the position $pos_2$ is determined as the symbol start position. In this case, optionally, there is no need to determine $pos_1$.

Alternatively, $(pos_1+pos_2+y)/2$ is determined as a symbol start position in which a start point of a second sequence is located.

Alternatively, $(pos_2+pos_1-y)/2$ is determined as a symbol start position in which a start point of a first sequence is located.

The optimal sampling point is determined as the start position in the symbol timing synchronization. In this case, because a symbol length is known by the receiving device 102 in advance and is constant, as long as the receiving device 102 determines an optimal sampling point of the start symbol occupied by either of the first generalized ZC sequence and the second generalized ZC sequence, optimal sampling points of all symbols can be determined.

After determining the optimal sampling point, the receiving device 102 may perform at least one of the following three operations:

determining a frame start position in the received signal according to a relative position that is known in advance and that is of the first generalized ZC sequence in a frame;

determining a subframe start position in the received signal according to a relative position that is known in advance and that is of the first generalized ZC sequence in a subframe; or determining a timeslot start position in the received signal according to a relative position that is known in advance and that is of the first generalized ZC sequence in a timeslot.

Therefore, the receiving device 102 completes the symbol timing synchronization.

In addition, a frequency offset value may be inversely calculated according to an offset of a sliding correlation peak position relative to a time domain position of a start symbol occupied by a sequence. For example, the frequency offset value is inversely calculated according to an offset of a time domain position of Corr1 relative to the time domain position of the start symbol occupied by the first generalized ZC sequence, and an offset of a time domain position of Corr2 relative to the time domain position of the start symbol occupied by the second generalized ZC sequence. Therefore, carrier frequency synchronization, that is, frequency offset estimation, can be completed by using the first generalized ZC sequence and the second generalized ZC sequence.

It should be noted that a premise of the foregoing described symbol timing synchronization and frequency offset estimation processes is:

$-B/2 \leq F \leq B/2$, where a frequency offset is F, and a symbol rate is B.

In this case, $$F = \frac{B u_1 u_2 (x-y)}{u_1 L_2 - u_2 L_1}.$$

When the frequency offset exceeds the foregoing range, the symbol timing synchronization and the frequency offset estimation can be completed by using the following blind search process.

First, the receiving device 102 determines each frequency offset $f_i$ that is in a frequency offset range of the receiving device 102 and that is an integer multiple of a symbol rate. Optionally, the frequency offset range may be a frequency range that is predefined in a protocol, or determined and pre-stored by the receiving device 102 before the receiving device 102 performs a sliding correlation.

Then, for each determined frequency offset $f_i$, the receiving device 102 performs a sliding correlation operation on the received synchronization signal by using the first generalized ZC sequence, to obtain a sliding correlation peak Corr1_$f_i$ in the frequency offset by means of calculation, where i=1, . . . , and P, i and P are positive integers, and P is a quantity of determined frequency offsets.

For each determined frequency offset $f_i$, the receiving device 102 traverses each of the at least two locally stored second generalized ZC sequences, and for each traversed second generalized ZC sequence $S_j$, performs a sliding correlation operation on the received synchronization signal by using the second generalized ZC sequence, to obtain a sliding correlation peak Corr2_$f_i$_$S_j$ in the second generalized ZC sequence in the frequency offset by means of calculation, where j=1, . . . , and Q, j and Q are positive integers, and Q is a quantity of locally stored second generalized ZC sequences.

Then, the receiving device 102 determines, from all frequency offsets $f_i$ according to each obtained sliding correlation peak Corr1_$f_i$ and each obtained sliding correlation peak Corr2_$f_i$_$S_j$, a frequency offset $f_0$ closest to an actual frequency offset and a second generalized ZC sequence $S_0$ that corresponds to the cell in which the receiving device 102 is located.

The receiving device 102 may determine that a frequency offset corresponding to a sliding correlation peak Corr_max is $f_0$, where $$\text{Corr\_max} = \text{MAX}_{i,j}\{\text{Corr1\_f}_i + \text{Corr2\_f}_i\_S_j\},$$

and determine that a second generalized ZC sequence corresponding to the sliding correlation peak Corr_max is $S_0$.

Alternatively, if a frequency offset corresponding to a greatest sliding correlation peak in all obtained Corr1_$f_i$ is equal to a frequency offset corresponding to a greatest sliding correlation peak in all obtained Corr2_$f_i$_$S_j$, the receiving device 102 determines that $f_0$ is the corresponding frequency offset, and determines that a second generalized ZC sequence corresponding to a greatest sliding correlation peak in all Corr2_$f_0$_$S_j$ is $S_0$; or if a frequency offset corresponding to a greatest sliding correlation peak in all obtained Corr1_$f_i$ is not equal to a frequency offset corresponding to a greatest sliding correlation peak in all obtained Corr2_$f_i$_$S_j$, the receiving device 102 determines that current synchronization fails, and performs synchronization again.

Finally, the receiving device 102 performs the symbol timing synchronization according to a time domain position of a sliding correlation peak Corr1_$f_0$ corresponding to the determined frequency offset $f_0$, a time domain position of a sliding correlation peak Corr2_$f_0$_$S_0$ in the second generalized ZC sequence $S_0$ in the determined frequency offset $f_0$, and a distance that is known in advance and that is between a time domain position of a start symbol occupied by the first generalized ZC sequence in the received signal and a time domain position of a start symbol occupied by the second generalized ZC sequence in the received signal, for example, performs the symbol timing synchronization according to the foregoing $pos_1$ and/or $pos_2$. The method is described as above. In this case, $x_1$ is the time domain position of the sliding correlation peak Corr1_$f_0$, and $x_2$ is the time domain position of the sliding correlation peak Corr2_$f_0$_$S_0$.

The receiving device 102 determines the cell identifier of the cell in which the receiving device 102 is located and/or the cell group identifier of the cell group in which the receiving device 102 is located. The receiving device 102 may determine, according to a pre-stored correspondence between a cell identifier and a second generalized ZC sequence, that a cell identifier corresponding to the second generalized ZC sequence $S_0$ is the cell identifier of the cell in which the receiving device 102 is located. The receiving device 102 may determine, according to a pre-stored correspondence between a cell group identifier and a second generalized ZC sequence, that a cell group identifier corresponding to the second generalized ZC sequence $S_0$ is the cell group identifier of the cell group in which the receiving device 102 is located.

For example, the symbol rate B=15 kHz, and the frequency offset range is from −48 kHz to +48 kHz. In this case, the receiving device 102 determines that blind tests need to be performed on integer frequency offsets, that is, integer multiples of the symbol rate 15 kHz: −45 kHz, −30 kHz, −15 kHz, 0, 15 kHz, 30 kHz, and 45 kHz.

For example, in a synchronization process, the actual frequency offset is 36 kHz, an integer frequency offset of the actual frequency offset is 30 kHz (15×2), and a decimal frequency offset is 6 kHz. When a blind test is performed on the integer frequency offset, 30 kHz is closest to the actual frequency offset, and is selected as an integer frequency offset estimate $f_0$ according to the foregoing method. Afterward, the decimal frequency offset may be determined according to a position of a sliding correlation peak and the like and according to the foregoing method. An integer frequency offset determining method and a decimal frequency offset determining method are combined, so that frequency offset estimation can be completed. In addition, in a decimal frequency offset determining process, the symbol timing synchronization is also completed.

For example, the receiving device 102 may determine the actual frequency offset F according to the time domain position of the sliding correlation peak Corr1_$f_0$ in the frequency offset $f_0$, the time domain position of the sliding correlation peak Corr2_$f_0$_$S_0$ in the second generalized ZC sequence in the frequency offset $f_0$, the distance that is known in advance and that is between the time domain position of the start symbol occupied by the first generalized ZC sequence in the received signal and the time domain position of the start symbol occupied by the second generalized ZC sequence in the received signal, and the frequency offset $f_0$.

For example, the actual frequency offset is determined as $$F = f_0 + \frac{Bu_1u_2(x-y)}{u_1L_2 - u_2L_1},$$

where B is the symbol rate, $L_1$ is the length of the first generalized ZC sequence, and $L_2$ is the length of the second generalized ZC sequence; and $x_1$ is the time domain position of the sliding correlation peak Corr1_$f_0$, $x_2$ is the time domain position of the sliding correlation peak Corr2_$f_0$_$S_0$, x=$x_2$−$x_1$, y is the distance that is known by the receiving device 102 in advance and that is between the time domain position of the start symbol occupied by the first generalized ZC sequence in the received signal and the time domain position of the start symbol occupied by the second generalized ZC sequence in the received signal, $u_1$ is the root index of the first generalized ZC sequence, $u_2$ is the root index of the second generalized ZC sequence, $L_1$ is the length of the first generalized ZC sequence, and $L_2$ is the length of the second generalized ZC sequence.

Optionally, the foregoing first signal and the foregoing second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

The following uses the first signal and the second signal as an example to separately describe three sending manners: a time division manner, a frequency division manner, and a time division and frequency division manner. The N1 generalized ZC sequences and the N2 generalized ZC sequences also separately have the three optional sending manners. Principles of the sending manners of the N1 generalized ZC sequences and the N2 generalized ZC sequences are similar to the sending manners of the first signal and the second signal. Details are not repeatedly described herein.

Figure 5A:
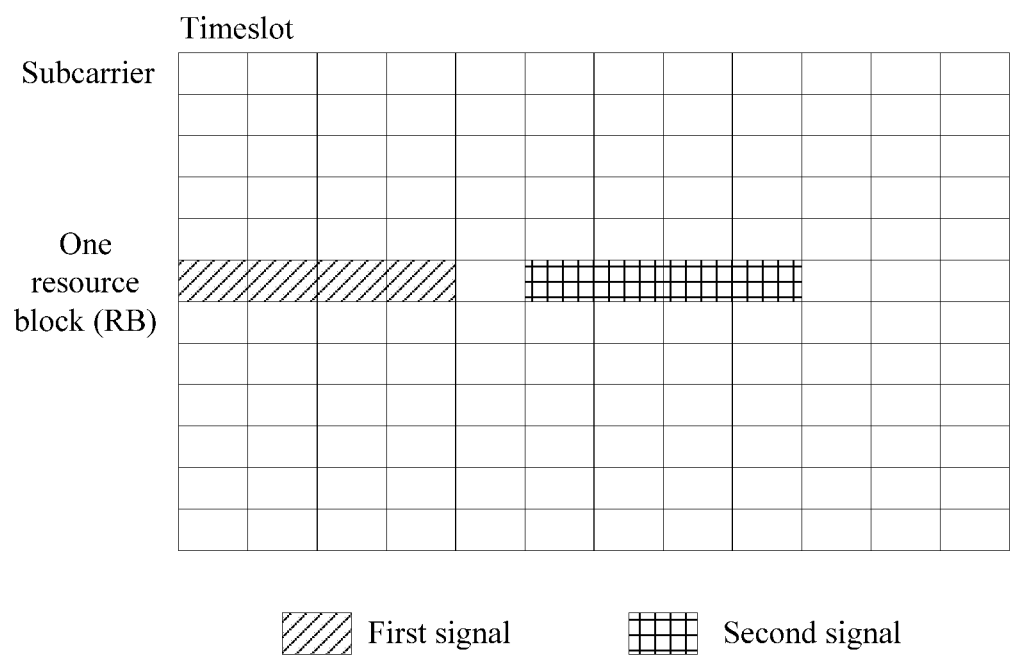
FIG. 5A to FIG. 5C are schematic diagrams of sending a first signal and a second signal.

The time division manner indicates that the two signals occupy different positions in a time domain. For example, as shown in FIG. 3, the two signals are successively sent in the time domain. For another example, as shown in FIG. 5A, the two signals are separately sent in the time domain.

Figure 5B:
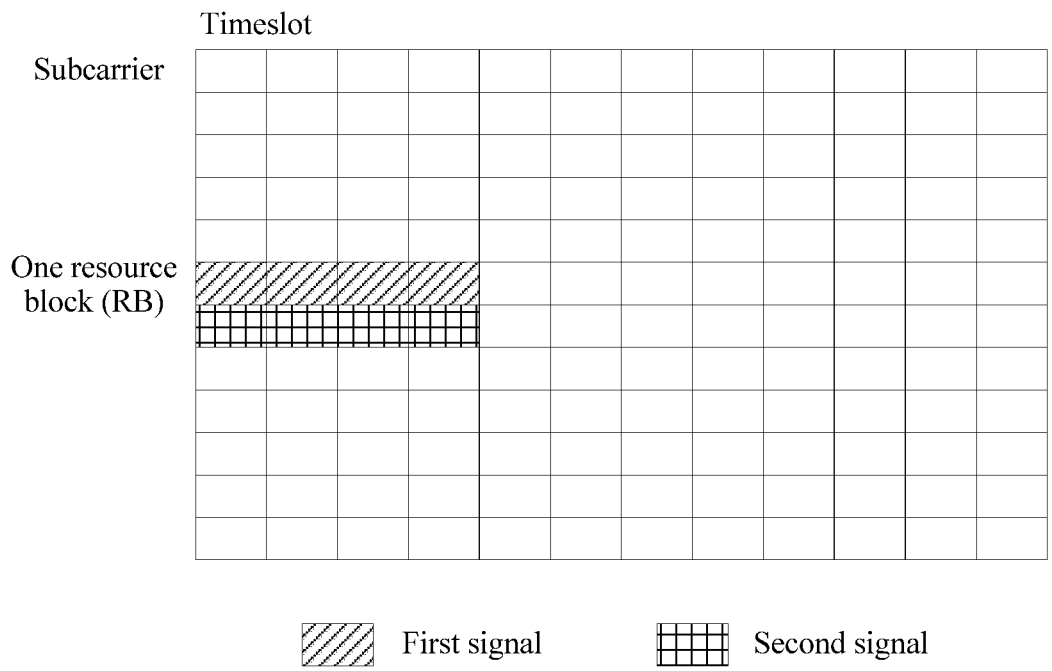

The frequency division manner indicates that the two signals occupy different positions in a frequency domain, for example, as shown in FIG. 5B.

Figure 5C:
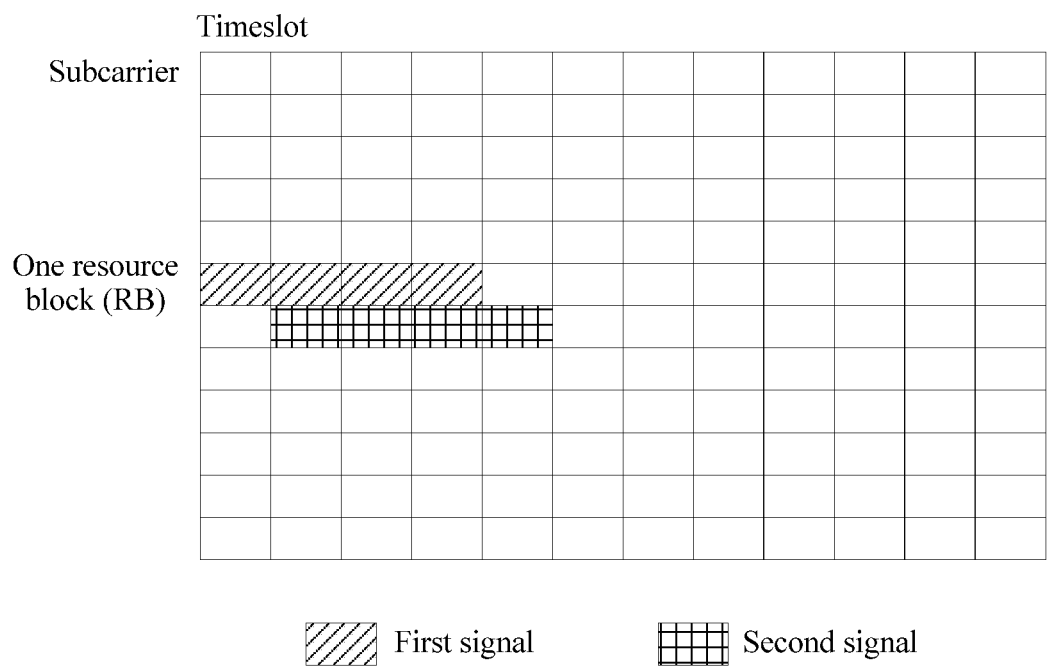

The time division and frequency division manner indicates that the two signals occupy different positions in a time domain and occupy different positions in a frequency domain, for example, as shown in FIG. 5C.

The following describes composition of the synchronization signal in this embodiment of the present invention by using several specific examples.

Example 1

N1=N2=1. The first signal includes a first generalized ZC sequence whose root index u is 1, and the second signal includes a second generalized ZC sequence. A root index of the second generalized ZC sequence is used to distinguish different cells or cell groups.

For example, cells in the wireless communications system are divided into three groups. A first group of cells correspond to a second generalized ZC sequence whose root index u is −1, a second group of cells correspond to a second generalized ZC sequence whose root index u is 2, and a third group of cells correspond to a second generalized ZC sequence whose root index u is −2.

Example 2

Similar to the example 1, N1=N2=1. The first signal includes a first generalized ZC sequence whose root index u is 1, and the second signal includes a second generalized ZC sequence. A root index of the second generalized ZC sequence is used to distinguish different cells or cell groups.

Similarly, cells in the wireless communications system may be divided into three groups. Different from the example 1, a first group of cells correspond to a second generalized ZC sequence whose root index u is −1, a second group of cells correspond to a generalized ZC sequence whose root index u is 0.5, and a third group of cells correspond to a generalized ZC sequence whose root index u is −0.5.

Example 3

The second signal in the synchronization signal includes multiple generalized ZC sequences. A relative position (a time domain position and/or a frequency domain position) between the multiple generalized ZC sequences is used to distinguish cells or cell groups, that is, different cells or different cell groups correspond to different relative positions.

For example, when the second signal in the synchronization signal includes three generalized ZC sequences, root indexes of the three generalized ZC sequences are respectively u=1, u=1, and u=2, and the three generalized ZC sequences are successively arranged in a time domain.

Figure 5D:
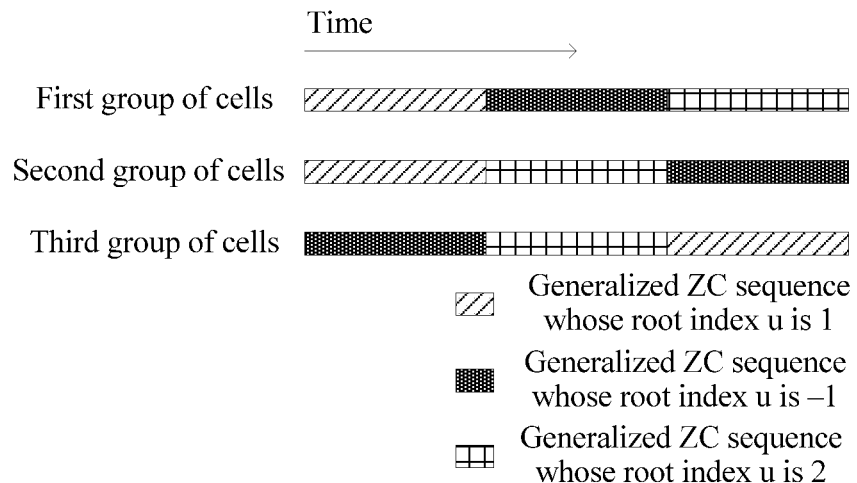
FIG. 5D is a schematic diagram of a manner in which all generalized ZC sequences are arranged in a synchronization signal in an example 3.

As shown in FIG. 5D, cells in the wireless communications system are divided into three groups. Three generalized ZC sequences corresponding to a first group of cells are arranged in the following order: a generalized ZC sequence whose root index is 1, a generalized ZC sequence whose root index is 1, and a generalized ZC sequence whose root index is 2. Three generalized ZC sequences corresponding to a second group of cells are arranged in the following order: a generalized ZC sequence whose root index is 1, a generalized ZC sequence whose root index is 2, and a generalized ZC sequence whose root index is 1. Three generalized ZC sequences corresponding to a third group of cells are arranged in the following order: a generalized ZC sequence whose root index is 1, a generalized ZC sequence whose root index is 2, and a generalized ZC sequence whose root index is 1.

Example 4

A root index of a generalized ZC sequence in the first signal in the synchronization signal is also used to distinguish cells. For different cells, root indexes of generalized ZC sequences in the first signal are different.

Generally, for geographically neighboring or proximate cells, these cells correspond to different root indexes of generalized ZC sequences in the first signal, but not all different cells correspond to different root indexes of generalized ZC sequences in the first signal.

For each determined frequency offset $f_i$, the receiving device 102 may perform, when performing frequency offset estimation, a sliding correlation operation on the received synchronization signal by using at least two currently stored generalized ZC sequences in the first signal, to obtain a greatest sliding correlation peak in each generalized ZC sequence in the first signal in the frequency offset by means of calculation.

Example 5

When N1>1 or N2>1, the receive end performs a sliding correlation operation on the received synchronization signal by separately using (N1+N2) sequences, and performs symbol timing synchronization by using a result of the sliding correlation operation.

Optionally, after being combined with a second synchronization sequence (which may be any sequence with a cross-correlation, such as a pseudo random sequence, a ZC sequence, or a gold sequence), the foregoing (N1+N2) synchronization sequences may be used as the synchronization signal. The foregoing (N1+N2) synchronization sequences are used to complete symbol timing synchronization and initial carrier frequency synchronization. The carrier frequency synchronization is the initial carrier frequency synchronization, cell identifier indication, frame number indication, signal detection, and/or the like. The second synchronization sequence may be used to complete further carrier frequency synchronization, the initial carrier frequency synchronization, frame synchronization, cell identifier indication, signal detection, and/or the like. The further carrier frequency synchronization is carrier frequency synchronization that has more exquisite accuracy and that is based on the initial carrier frequency synchronization.

A process in which the symbol timing synchronization and the initial carrier frequency synchronization are completed by using the (N1+N2) synchronization sequences is described above. A part or all of cell identifiers may be carried in an order in which N sequences are sent in a time domain, where different orders indicate different cells; or may be carried by N sequences multiplied by a feature sequence, where different cells use different feature sequences, and the feature sequence may be any sequence with a cross-correlation, such as a pseudo random sequence, a ZC sequence, or a gold sequence. Similarly, a part or all of frame numbers or timeslot numbers may also be carried by using a method similar to the cell identifier carrying method.

The second synchronization sequence may include K sub-sequences, and K is greater than or equal to 1. Each sub-sequence may be any sequence with a cross-correlation feature, such as a pseudo random sequence, a ZC sequence, or a gold sequence, or a sequence obtained by performing cyclic shift on any sequence with a cross-correlation feature. Performing the further carrier frequency synchronization by using the second synchronization sequence may be performing the frequency offset estimation by using a phase deviation between the second synchronization sequence in the received signal and a local sequence locally pre-stored in the second synchronization sequence. Performing frame number indication or cell identifier indication by using the second synchronization sequence may be: For different frame numbers or cells, different sequences are used as the second synchronization sequence; or for different frame numbers or cells, different relative orders in the K sub-sequences are used to indicate different frame numbers or cell numbers.

Performing signal detection by using the (N1+N2) synchronization sequences or the second synchronization sequence may be: A separately generated correlation peak value is compared with a preset threshold value, and if the correlation peak value exceeds the threshold value, it is considered that the signal is a valid signal; or if the correlation peak value does not exceed the threshold value, it is considered that current synchronization fails, and synchronization work.

In addition, modulation manners of all signals in the embodiment of present invention are not limited. For example, the synchronization signal may be a single carrier signal, or may be an orthogonal multi-carrier signal, such as an orthogonal frequency division multiplexing (Orthogonal Frequency Division Multiplexing, OFDM) signal. The synchronization signal and a non-synchronization signal (such as a data signal or a control signal) may be sent in a time division and/or frequency division manner.

For example, (1) both the synchronization signal and the non-synchronization signal are OFDM signals, and the synchronization signal and the non-synchronization signal are sent in a time division or frequency division manner.

(2) The synchronization signal is a single carrier signal, the non-synchronization signal is an OFDM signal, and the synchronization signal and the non-synchronization signal are sent in a time division or frequency division manner.

(3) The synchronization signal is a single carrier signal, the non-synchronization signal is a single carrier signal, and the synchronization signal and the non-synchronization signal are sent in a time division or frequency division manner.

(4) The synchronization signal is an OFDM signal, the non-synchronization signal is a single carrier signal, and the synchronization signal and the non-synchronization signal are sent in a time division or frequency division manner.

Based on an embodiment of invention concept same as the wireless communications system provided in this embodiment of the present invention, the embodiments of the present invention further provide a sending device, a receiving device, and a symbol timing synchronization method. A problem-resolving principle is similar to that of the wireless communications system provided in this embodiment of the present invention. For implementation of the sending device, the receiving device, and the symbol timing synchronization method, refer to the implementation of the system. Details are not repeatedly described herein.

Figure 6:
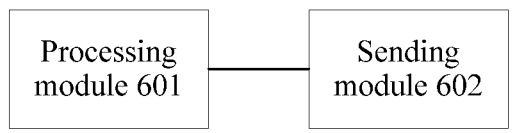
FIG. 6 is a schematic structural diagram of a first sending device according to an embodiment of the present invention.

FIG. 6 is a schematic structural diagram of a first sending device according to an embodiment of the present invention. As shown in FIG. 6, the sending device includes a processing module 601 and a sending module 602.

The processing module 601 is configured to determine a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi un(n+1+2q)/L}, q \in Z, L \in Z^+, n=0,1,\ldots L-1,$$
$$0<|u|<L, u \in R, \text{ where}$$

u is a root index of the generalized ZC sequence, q is an offset index of the generalized ZC sequence, L is a length of the generalized ZC sequence, and L is a positive integer.

Root indexes, offset indexes, and lengths of all generalized ZC sequences in the first signal may be the same, or may be different, and different cells correspond to the same first signal. Root indexes, offset indexes, and lengths of all generalized ZC sequences in the second signal may be the same, or may be different, and different cells or different cell groups correspond to different second signals.

There are at least two generalized ZC sequences in (N1+N2) generalized ZC sequences including the N1 generalized ZC sequences and the N2 generalized ZC sequences, and root indexes of the two generalized ZC sequences are different.

The sending module 602 is configured to send the synchronization signal determined by the processing module 601, where the synchronization signal is used for symbol timing synchronization; and if different cells correspond to different second signals, the synchronization signal is further used to determine a cell identifier; or if different cell groups correspond to different second signals, the synchronization signal is further used to determine a cell group identifier.

Optionally, N1=N2=1.

Optionally, the synchronization signal is further used for carrier frequency synchronization.

Optionally, the first signal and the second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

For another optional implementation of the sending device, refer to the foregoing sending device 101. Details are not repeatedly described herein.

Figure 11:
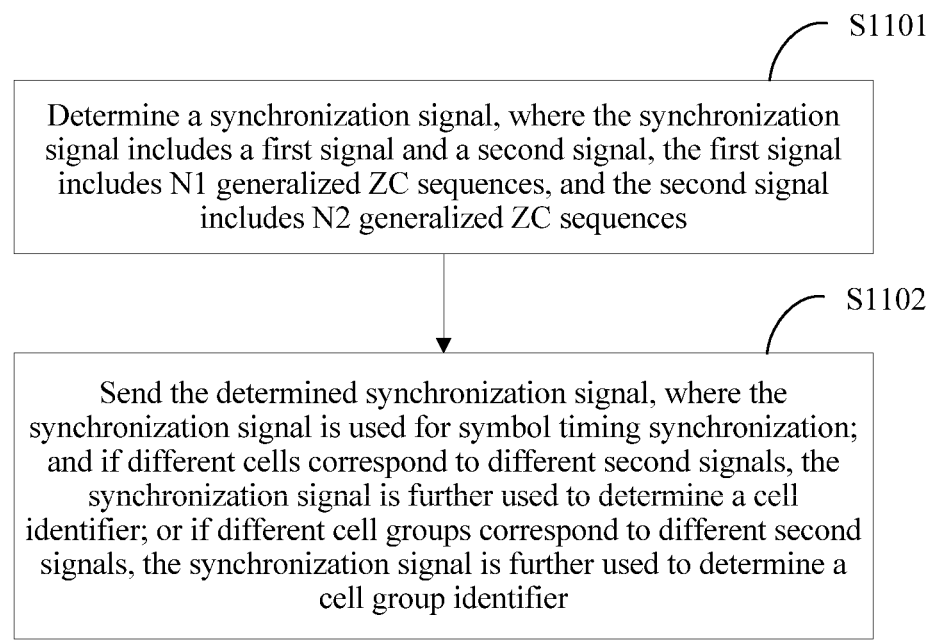
FIG. 11 is a flowchart of a second symbol timing synchronization method according to an embodiment of the present invention.

The first sending device shown in FIG. 6 may be configured to execute the method shown in FIG. 11.

Figure 7:
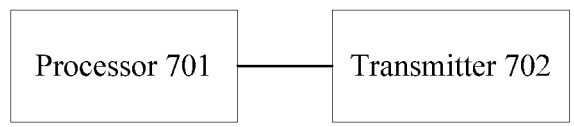
FIG. 7 is a schematic structural diagram of a second sending device according to an embodiment of the present invention.

FIG. 7 is a schematic structural diagram of a second sending device according to an embodiment of the present invention. As shown in FIG. 7, the sending device includes a processor 701 and a transmitter 702.

The processor 701 is configured to determine a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi un(n+1+2q)/L}, q \in Z, L \in Z^+, n=0,1,\ldots L-1,$$
$$0<|u|<L, u \in R, \text{ where}$$

u is a root index of the generalized ZC sequence, q is an offset index of the generalized ZC sequence, L is a length of the generalized ZC sequence, and L is a positive integer.

Root indexes, offset indexes, and lengths of all generalized ZC sequences in the first signal may be the same, or may be different, and different cells correspond to the same first signal. Root indexes, offset indexes, and lengths of all generalized ZC sequences in the second signal may be the same, or may be different, and different cells or different cell groups correspond to different second signals.

There are at least two generalized ZC sequences in (N1+N2) generalized ZC sequences including the N1 generalized ZC sequences and the N2 generalized ZC sequences, and root indexes of the two generalized ZC sequences are different.

The transmitter 702 is configured to send the synchronization signal determined by the processor 701, where the synchronization signal is used for symbol timing synchronization; and if different cells correspond to different second signals, the synchronization signal is further used to determine a cell identifier; or if different cell groups correspond to different second signals, the synchronization signal is further used to determine a cell group identifier.

For another optional implementation of the processor 701, refer to the foregoing processing module 601. For another optional implementation of the transmitter 702, refer to the foregoing sending module 602. For another optional implementation of the sending device, refer to the foregoing sending device 101. Details are not repeatedly described herein.

The second sending device shown in FIG. 7 may be configured to execute the method shown in FIG. 11.

Figure 8:
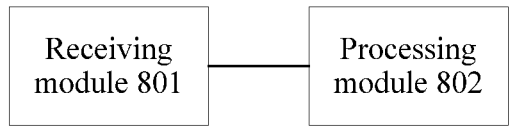
FIG. 8 is a schematic structural diagram of a first receiving device according to an embodiment of the present invention.

FIG. 8 is a schematic structural diagram of a first receiving device according to an embodiment of the present invention. As shown in FIG. 8, the receiving device includes a receiving module 801 and a processing module 802.

The receiving module 801 is configured to receive a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi un(n+1+2q)/L}, q \in Z, L \in Z^+, n=0,1,\ldots L-1,$$
$$0<|u|<L, u \in R, \text{ where}$$

u is a root index of the generalized ZC sequence, q is an offset index of the generalized ZC sequence, L is a length of the generalized ZC sequence, and L is a positive integer.

Root indexes, offset indexes, and lengths of all generalized ZC sequences in the first signal may be the same, or may be different, and different cells correspond to the same first signal. Root indexes, offset indexes, and lengths of all generalized ZC sequences in the second signal may be the same, or may be different, and different cells or different cell groups correspond to different second signals.

There are at least two generalized ZC sequences in (N1+N2) generalized ZC sequences including the N1 generalized ZC sequences and the N2 generalized ZC sequences, and root indexes of the two generalized ZC sequences are different.

The processing module 802 is configured to: perform a first sliding correlation operation on the synchronization signal by using each of the N1 generalized ZC sequences locally stored by the receiving device; traverse each of at least two groups of N2 generalized ZC sequences that are locally stored, and for each group of N2 generalized ZC sequences that are traversed, perform a second sliding correlation operation on the received synchronization signal by using each generalized ZC sequence in the group of N2 generalized ZC sequences; perform symbol timing synchronization according to a result of each first sliding correlation operation and a result of each second sliding correlation operation; and if different cells correspond to different second signals, determine, according to the result of each first sliding correlation operation and the result of each second sliding correlation operation, a cell identifier of a cell in which the receiving device is located; or if different cell groups correspond to different second signals, determine, according to the result of each first sliding correlation operation and the result of each second sliding correlation operation, a cell group identifier of a cell group in which the receiving device is located.

Optionally, N1=N2=1.

The N1 generalized ZC sequence is a first generalized ZC sequence, and the N2 generalized ZC sequence is a second generalized ZC sequence.

The processing module 802 is specifically configured to: perform the first sliding correlation operation on the synchronization signal by using the first generalized ZC sequence locally stored by the receiving device; and perform the second sliding correlation operation on the synchronization signal by using each of at least two second generalized ZC sequences locally stored by the receiving device.

Optionally, the processing module 802 is further configured to: before performing the first sliding correlation operation and the second sliding correlation operation, determine each frequency offset $f_i$ that is in a frequency offset range of the receiving device and that is an integer multiple of a symbol rate.

When performing the first sliding correlation operation on the synchronization signal by using the first generalized ZC sequence locally stored by the receiving device, the processing module 802 is specifically configured to:

for each determined frequency offset $f_i$, perform a sliding correlation operation on the synchronization signal by using the first generalized ZC sequence, to obtain a sliding correlation peak Corr1_$f_i$ in the frequency offset by means of calculation, where i=1, . . . , and P, i and P are positive integers, and P is a quantity of determined frequency offsets.

When performing the second sliding correlation operation on the synchronization signal by using each of the at least two second generalized ZC sequences locally stored by the receiving device, the processing module 802 is specifically configured to:

for each determined frequency offset $f_i$, traverse each of the at least two second generalized ZC sequences locally stored by the receiving device; and for each traversed second generalized ZC sequence $S_j$, perform a sliding correlation operation on the synchronization signal by using the second generalized ZC sequence, to obtain a sliding correlation peak Corr2_$f_i$_$S_j$ in the second generalized ZC sequence in the frequency offset by means of calculation, where j=1, . . . , and Q, j and Q are positive integers, and Q is a quantity of locally stored second generalized ZC sequences.

When performing the symbol timing synchronization according to the result of each first sliding correlation operation and the result of each second sliding correlation operation, the processing module 802 is specifically configured to:

determine, from all frequency offsets $f_i$ according to each obtained sliding correlation peak Corr1_$f_i$ and each obtained sliding correlation peak Corr2_$f_i$_$S_j$, a frequency offset $f_0$ closest to an actual frequency offset and a second generalized ZC sequence $S_0$ that corresponds to the cell in which the receiving device is located; and perform the symbol timing synchronization according to a time domain position of a sliding correlation peak Corr1_$f_0$ corresponding to the determined frequency offset $f_0$, a time domain position of a sliding correlation peak Corr2_$f_0$_$S_0$ in the second generalized ZC sequence $S_0$ in the determined frequency offset $f_0$, and a distance that is known in advance and that is between a time domain position of a start symbol occupied by the first generalized ZC sequence in the synchronization signal and a time domain position of a start symbol occupied by the second generalized ZC sequence in the synchronization signal.

Optionally, when determining, according to the result of each first sliding correlation operation and the result of each second sliding correlation operation, the cell identifier of the cell in which the receiving device is located, the processing module 802 is specifically configured to: determine, according to a correspondence that is pre-stored by the receiving device and that is between a cell identifier and a second generalized ZC sequence, that a cell identifier corresponding to the second generalized ZC sequence $S_0$ is the cell identifier of the cell in which the receiving device is located; and/or when determining, according to the result of each first sliding correlation operation and the result of each second sliding correlation operation, the cell group identifier of the cell group in which the receiving device is located, the processing module 802 is specifically configured to: determine, according to a correspondence that is pre-stored by the receiving device and that is between a cell group identifier and a second generalized ZC sequence, that a cell group identifier corresponding to the second generalized ZC sequence $S_0$ is the cell group identifier of the cell group in which the receiving device is located.

Optionally, the processing module 802 is specifically configured to:

determine that a frequency offset corresponding to a sliding correlation peak Corr_max is $f_0$, wherein Corr_max$=_{i,j}^{MAX}\{$Corr1_$f_i$+Corr2_$f_i\_S_j\}$; and determine that a second generalized ZC sequence corresponding to the sliding correlation peak Corr_max is $S_0$.

Optionally, the processing module 802 is specifically configured to:

if a frequency offset corresponding to a greatest sliding correlation peak in all obtained Corr1_$f_i$ is equal to a frequency offset corresponding to a greatest sliding correlation peak in all obtained Corr2_$f_i\_S_j$, determine that $f_0$ is the corresponding frequency offset, and determine that a second generalized ZC sequence corresponding to a greatest sliding correlation peak in all Corr2_$f_i\_S_j$ is $S_0$.

Optionally, the first generalized ZC sequence is before the second generalized ZC sequence in a time domain; and when performing the symbol timing synchronization, the processing module 802 is specifically configured to:

determine that the position $pos_1$ of the start symbol occupied by the first generalized ZC sequence is:

$$pos_1 = x_1 - \frac{L_1 u_2 (x-y)}{u_1 L_2 - u_2 L_1},$$

where $x_1$ is the time domain position of the sliding correlation peak Corr1_$f_0$, $x_2$ is the time domain position of the sliding correlation peak Corr2_$f_0\_S_0$, $x=x_2-x_1$, y is the distance that is known in advance and that is between the time domain position of the start point of the first generalized ZC sequence in the synchronization signal and the time domain position of the start point of the second generalized ZC sequence in the synchronization signal, $u_1$ is a root index of the first generalized ZC sequence, $u_2$ is a root index of the second generalized ZC sequence, $L_1$ is a length of the first generalized ZC sequence, and $L_2$ is a length of the second generalized ZC sequence;

determine a position of each symbol in the received signal according to the determined position of the start symbol occupied by the first generalized ZC sequence and a symbol length that is known in advance; and perform at least one of the following three operations:

determining a frame start position in the received signal according to a relative position that is known in advance and that is of the first generalized ZC sequence in a frame;

determining a subframe start position in the received signal according to a relative position that is known in advance and that is of the first generalized ZC sequence in a subframe; or determining a timeslot start position in the received signal according to a relative position that is known in advance and that is of the first generalized ZC sequence in a timeslot.

Optionally, the processing module 802 is further configured to:

after determining, from all frequency offsets $f_i$, the frequency offset $f_0$ closest to the actual frequency offset, determine the actual frequency offset F according to the time domain position of the sliding correlation peak Corr1_$f_0$ in the frequency offset $f_0$, the time domain position of the sliding correlation peak Corr2_$f_0\_S_0$ in the second generalized ZC sequence in the frequency offset $f_0$, the distance that is known in advance and that is between the time domain position of the start symbol occupied by the first generalized ZC sequence in the synchronization signal and the time domain position of the start symbol occupied by the second generalized ZC sequence in the synchronization signal, and the frequency offset $f_0$.

Optionally, $$F = f_0 + \frac{B u_1 u_2 (x-y)}{u_1 L_2 - u_2 L_1},$$

where

B is the symbol rate, $L_1$ is the length of the first generalized ZC sequence, and $L_2$ is the length of the second generalized ZC sequence; and $x_1$ is the time domain position of the sliding correlation peak Corr1_$f_0$, $x_2$ is the time domain position of the sliding correlation peak Corr2_$f_0\_S_0$, $x=x_2-x_1$, y is the distance that is known in advance and that is between the time domain position of the start symbol occupied by the first generalized ZC sequence in the synchronization signal and the time domain position of the start symbol occupied by the second generalized ZC sequence in the synchronization signal, $u_1$ is the root index of the first generalized ZC sequence, $u_2$ is the root index of the second generalized ZC sequence, $L_1$ is the length of the first generalized ZC sequence, and $L_2$ is the length of the second generalized ZC sequence.

Optionally, the first signal and the second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

For another optional implementation of the receiving device, refer to the foregoing receiving device 102. Details are not repeatedly described herein.

Figure 10:
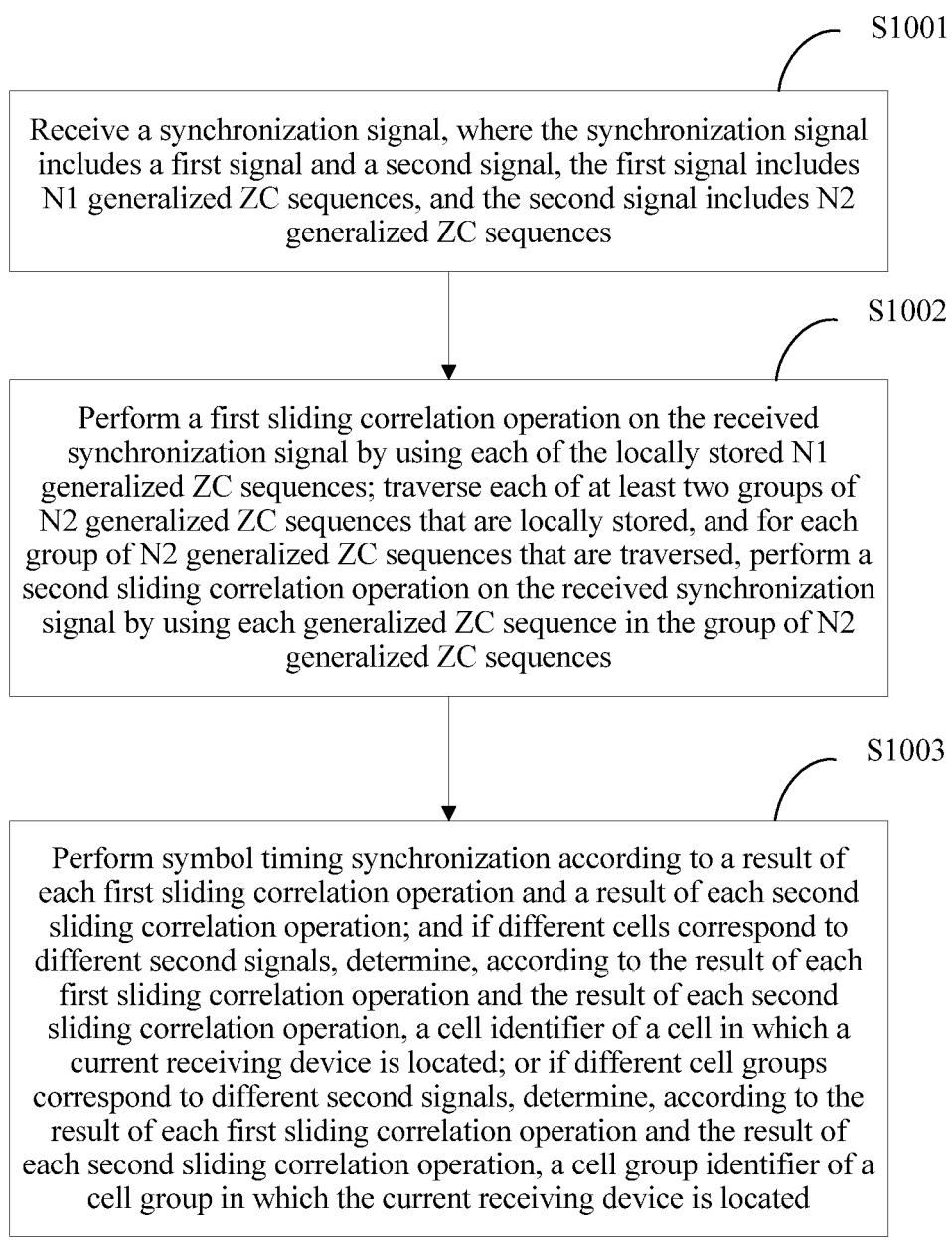
FIG. 10 is a flowchart of a first symbol timing synchronization method according to an embodiment of the present invention.

The first receiving device shown in FIG. 8 may be configured to execute the method shown in FIG. 10.

Figure 9:
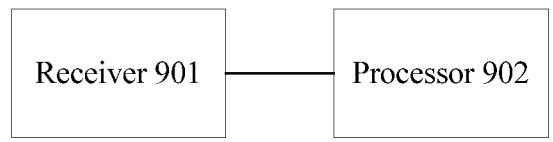
FIG. 9 is a schematic structural diagram of a second receiving device according to an embodiment of the present invention.

FIG. 9 is a schematic structural diagram of a second receiving device according to an embodiment of the present invention. As shown in FIG. 9, the receiving device includes a receiver 901 and a processor 902.

The receiver 901 is configured to receive a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi un(n+1+2q)/L}, q \in Z, L \in Z^+, n=0,1,\ldots L-1,$$
$$0<|u|<L, u \in R, \text{ where}$$

u is a root index of the generalized ZC sequence, q is an offset index of the generalized ZC sequence, L is a length of the generalized ZC sequence, and L is a positive integer.

Root indexes, offset indexes, and lengths of all generalized ZC sequences in the first signal may be the same, or may be different, and different cells correspond to the same first signal. Root indexes, offset indexes, and lengths of all generalized ZC sequences in the second signal may be the same, or may be different, and different cells or different cell groups correspond to different second signals.

There are at least two generalized ZC sequences in (N1+N2) generalized ZC sequences including the N1 generalized ZC sequences and the N2 generalized ZC sequences, and root indexes of the two generalized ZC sequences are different.

The processor 902 is configured to: perform a first sliding correlation operation on the synchronization signal by using each of the N1 generalized ZC sequences locally stored by the receiving device; traverse each of at least two groups of N2 generalized ZC sequences that are locally stored, and for each group of N2 generalized ZC sequences that are traversed, perform a second sliding correlation operation on the received synchronization signal by using each generalized ZC sequence in the group of N2 generalized ZC sequences; perform symbol timing synchronization according to a result of each first sliding correlation operation and a result of each second sliding correlation operation; and if different cells correspond to different second signals, determine, according to the result of each first sliding correlation operation and the result of each second sliding correlation operation, a cell identifier of a cell in which the receiving device is located; or if different cell groups correspond to different second signals, determine, according to the result of each first sliding correlation operation and the result of each second sliding correlation operation, a cell group identifier of a cell group in which the receiving device is located.

For another optional implementation of the processor 902, refer to the foregoing processing module 802. For another optional implementation of the receiver 901, refer to the foregoing receiving module 801. For another optional implementation of the receiving device, refer to the foregoing receiving device 102. Details are not repeatedly described herein.

The second receiving device shown in FIG. 8 may be configured to execute the method shown in FIG. 10.

FIG. 10 is a flowchart of a first symbol timing synchronization method according to an embodiment of the present invention. As shown in FIG. 10, the method includes the following steps.

S1001: Receive a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$$ZC(n)=e^{-j\pi un(n+1+2q)/L}, q \in Z, L \in Z^+, n=0,1,\ldots L-1,$$
$$0<|u|<L, u \in R, \text{ where}$$

u is a root index of the generalized ZC sequence, q is an offset index of the generalized ZC sequence, L is a length of the generalized ZC sequence, and L is a positive integer.

Root indexes, offset indexes, and lengths of all generalized ZC sequences in the first signal may be the same, or may be different, and different cells correspond to the same first signal. Root indexes, offset indexes, and lengths of all generalized ZC sequences in the second signal may be the same, or may be different, and different cells or different cell groups correspond to different second signals.

There are at least two generalized ZC sequences in (N1+N2) generalized ZC sequences including the N1 generalized ZC sequences and the N2 generalized ZC sequences, and root indexes of the two generalized ZC sequences are different.

S1002: Perform a first sliding correlation operation on the received synchronization signal by using each of the locally stored N1 generalized ZC sequences; traverse each of at least two groups of N2 generalized ZC sequences that are locally stored, and for each group of N2 generalized ZC sequences that are traversed, perform a second sliding correlation operation on the received synchronization signal by using each generalized ZC sequence in the group of N2 generalized ZC sequences.

S1003: Perform symbol timing synchronization according to a result of each first sliding correlation operation and a result of each second sliding correlation operation; and if different cells correspond to different second signals, determine, according to the result of each first sliding correlation operation and the result of each second sliding correlation operation, a cell identifier of a cell in which a current receiving device is located; or if different cell groups correspond to different second signals, determine, according to the result of each first sliding correlation operation and the result of each second sliding correlation operation, a cell group identifier of a cell group in which the current receiving device is located.

Optionally, N1=N2=1.

The N1 generalized ZC sequence is a first generalized ZC sequence, and the N2 generalized ZC sequence is a second generalized ZC sequence.

The performing a first sliding correlation operation on the received synchronization signal includes: performing the first sliding correlation operation on the received synchronization signal by using the locally stored first generalized ZC sequence.

The traversing each of at least two groups of N2 generalized ZC sequences that are locally stored, and for each group of traversed generalized ZC sequences, performing a second sliding correlation operation on the received synchronization signal by using each generalized ZC sequence in the group of N2 generalized ZC sequences includes:

performing the second sliding correlation operation on the received synchronization signal by using each of at least two locally stored second generalized ZC sequences.

Optionally, before the first sliding correlation operation and the second sliding correlation operation are performed, the method further includes: determining each frequency offset $f_i$ that is in a frequency offset range of the current receiving device and that is an integer multiple of a symbol rate.

The performing the first sliding correlation operation on the received synchronization signal by using the locally stored first generalized ZC sequence includes:

for each determined frequency offset $f_i$, performing a sliding correlation operation on the received synchronization signal by using the first generalized ZC sequence, to obtain a sliding correlation peak Corr1_$f_i$ in the frequency offset by means of calculation, where i=1, . . . , and P, i and P are positive integers, and P is a quantity of determined frequency offsets.

The performing the second sliding correlation operation on the received synchronization signal by using each of at least two locally stored second generalized ZC sequences includes:

for each determined frequency offset $f_i$, traversing each of the at least two locally stored second generalized ZC sequences; and for each traversed second generalized ZC sequence $S_j$, performing a sliding correlation operation on the received synchronization signal by using the second generalized ZC sequence, to obtain a sliding correlation peak Corr2_$f_i$_$S_j$ in the second generalized ZC sequence in the frequency offset by means of calculation, where j=1, . . . , and Q, j and Q are positive integers, and Q is a quantity of locally stored second generalized ZC sequences.

The performing symbol timing synchronization according to a result of each first sliding correlation operation and a result of each second sliding correlation operation includes:

determining, from all frequency offsets $f_i$ according to each obtained sliding correlation peak Corr1_$f_i$ and each obtained sliding correlation peak Corr2_$f_i$_$S_j$, a frequency offset $f_0$ closest to an actual frequency offset and a second generalized ZC sequence $S_0$ that corresponds to the cell in which the current receiving device is located; and performing the symbol timing synchronization according to a time domain position of a sliding correlation peak Corr1_$f_0$ corresponding to the determined frequency offset $f_0$, a time domain position of a sliding correlation peak Corr2_$f_0$_$S_0$ in the second generalized ZC sequence $S_0$ in the determined frequency offset $f_0$, and a distance that is known in advance and that is between a time domain position of a start symbol occupied by the first generalized ZC sequence in the synchronization signal and a time domain position of a start symbol occupied by the second generalized ZC sequence in the synchronization signal.

Optionally, the determining, according to the result of each first sliding correlation operation and the result of each second sliding correlation operation, a cell identifier of a cell in which a current receiving device is located includes: determining, according to a pre-stored correspondence between a cell identifier and a second generalized ZC sequence, that a cell identifier corresponding to the second generalized ZC sequence $S_0$ is the cell identifier of the cell in which the current receiving device is located; and/or the determining, according to the result of each first sliding correlation operation and the result of each second sliding correlation operation, a cell group identifier of a cell group in which the current receiving device is located includes: determining, according to a pre-stored correspondence between a cell group identifier and a second generalized ZC sequence, that a cell group identifier corresponding to the second generalized ZC sequence $S_0$ is the cell group identifier of the cell group in which the current receiving device is located.

Optionally, the determining, from all frequency offsets $f_i$ according to each obtained sliding correlation peak Corr1_$f_i$ and each obtained sliding correlation peak Corr2_$f_i$_$S_j$, a frequency offset $f_0$ closest to an actual frequency offset and a second generalized ZC sequence $S_0$ that corresponds to the cell in which the current receiving device is located includes:

determining that a frequency offset corresponding to a sliding correlation peak Corr_max is $f_0$, where $\text{Corr}_{max} = \underset{i,j}{MAX}\{\text{Corr1\_}f_i + \text{Corr2\_}f_i\_S_j\}$; and determining that a second generalized ZC sequence corresponding to the sliding correlation peak Corr_max is $S_0$.

Optionally, the determining, from all frequency offsets $f_i$ according to each obtained sliding correlation peak Corr1_$f_i$ and each obtained sliding correlation peak Corr2_$f_i$_$S_j$, a frequency offset $f_0$ closest to an actual frequency offset and a second generalized ZC sequence $S_0$ that corresponds to the cell in which the current receiving device is located includes:

if a frequency offset corresponding to a greatest sliding correlation peak in all obtained Corr1_$f_i$ is equal to a frequency offset corresponding to a greatest sliding correlation peak in all obtained Corr2_$f_i$_$S_j$, determining that $f_0$ is the corresponding frequency offset, and determining that a second generalized ZC sequence corresponding to a greatest sliding correlation peak in all Corr2_$f_i$_$S_j$ is $S_0$.

Optionally, the first generalized ZC sequence is before the second generalized ZC sequence in a time domain; and the symbol timing synchronization includes:

determining that the position $pos_1$ of the start symbol occupied by the first generalized ZC sequence is:

$$pos_1 = x_1 - \frac{L_1 u_2 (x-y)}{u_1 L_2 - u_2 L_1},$$

where $x_1$ is the time domain position of the sliding correlation peak Corr1_$f_0$, $x_2$ is the time domain position of the sliding correlation peak Corr2_$f_0$_$S_0$, $x = x_2 - x_1$, y is the distance that is known in advance and that is between the time domain position of the start point of the first generalized ZC sequence in the synchronization signal and the time domain position of the start point of the second generalized ZC sequence in the synchronization signal, $u_1$ is a root index of the first generalized ZC sequence, $u_2$ is a root index of the second generalized ZC sequence, $L_1$ is a length of the first generalized ZC sequence, and $L_2$ is a length of the second generalized ZC sequence;

determining a position of each symbol in the received signal according to the determined position of the start symbol occupied by the first generalized ZC sequence and a symbol length that is known in advance; and performing at least one of the following three operations:

determining a frame start position in the received signal according to a relative position that is known in advance and that is of the first generalized ZC sequence in a frame;

determining a subframe start position in the received signal according to a relative position that is known in advance and that is of the first generalized ZC sequence in a subframe; or determining a timeslot start position in the received signal according to a relative position that is known in advance and that is of the first generalized ZC sequence in a timeslot.

Optionally, after the determining, from all frequency offsets $f_i$, a frequency offset $f_0$ closest to an actual frequency offset, the method further includes:

determining the actual frequency offset F according to the time domain position of the sliding correlation peak Corr1_$f_0$ in the frequency offset $f_0$, the time domain position of the sliding correlation peak Corr2_$f_0$_$S_0$ in the second generalized ZC sequence in the frequency offset $f_0$, the distance that is known in advance and that is between the time domain position of the start symbol occupied by the first generalized ZC sequence in the synchronization signal and the time domain position of the start symbol occupied by the second generalized ZC sequence in the synchronization signal, and the frequency offset $f_0$.

Optionally, $$F = f_0 + \frac{Bu_1u_2(x-y)}{u_1L_2 - u_2L_1},$$

where

B is the symbol rate, $L_1$ is the length of the first generalized ZC sequence, and $L_2$ is the length of the second generalized ZC sequence; and $x_1$ is the time domain position of the sliding correlation peak Corr1_$f_0$, $x_2$ is the time domain position of the sliding correlation peak Corr2_$f_0$_$S_0$, $x=x_2-x_1$, y is the distance that is known in advance and that is between the time domain position of the start symbol occupied by the first generalized ZC sequence in the synchronization signal and the time domain position of the start symbol occupied by the second generalized ZC sequence in the synchronization signal, $u_1$ is the root index of the first generalized ZC sequence, $u_2$ is the root index of the second generalized ZC sequence, $L_1$ is the length of the first generalized ZC sequence, and $L_2$ is the length of the second generalized ZC sequence.

Optionally, the first signal and the second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

For another optional implementation of the method, refer to processing of the foregoing receiving device 102. Details are not repeatedly described herein.

FIG. 11 is a flowchart of a second symbol timing synchronization method according to an embodiment of the present invention. As shown in FIG. 11, the method includes the following steps.

S1101: Determine a synchronization signal, where the synchronization signal includes a first signal and a second signal, the first signal includes N1 generalized ZC sequences, the second signal includes N2 generalized ZC sequences, N1 and N2 are positive integers, and the generalized ZC sequence is:

$ZC(n) = e^{-j\pi un(n+1+2q)/L}, q \in Z, L \in Z^+, n=0,1,\ldots L-1,$
$0<|u|<L, u \in R$, where u is a root index of the generalized ZC sequence, q is an offset index of the generalized ZC sequence, L is a length of the generalized ZC sequence, and L is a positive integer.

Root indexes, offset indexes, and lengths of all generalized ZC sequences in the first signal may be the same, or may be different, and different cells correspond to the same first signal. Root indexes, offset indexes, and lengths of all generalized ZC sequences in the second signal may be the same, or may be different, and different cells or different cell groups correspond to different second signals.

There are at least two generalized ZC sequences in (N1+N2) generalized ZC sequences including the N1 generalized ZC sequences and the N2 generalized ZC sequences, and root indexes of the two generalized ZC sequences are different.

S1102: Send the determined synchronization signal, where the synchronization signal is used for symbol timing synchronization; and if different cells correspond to different second signals, the synchronization signal is further used to determine a cell identifier; or if different cell groups correspond to different second signals, the synchronization signal is further used to determine a cell group identifier.

Optionally, N1=N2=1.

Optionally, the synchronization signal is further used for carrier frequency synchronization.

Optionally, the first signal and the second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

For another optional implementation of the method, refer to processing of the foregoing sending device 101. Details are not repeatedly described herein.

In conclusion, in this embodiment of the present invention, because the synchronization signal in the foregoing form is used, the receiving device may perform the symbol timing synchronization according to a relationship between a sliding correlation peak generated when a sliding correlation is performed on the N1 generalized ZC sequences and a sliding correlation peak generated when a sliding correlation is performed on the N2 generalized ZC sequences. This has relatively low implementation complexity, compared with an existing method in which a low-cost M2M terminal or the like needs to perform grid search multiple times to compensate for a relatively large phase rotation.

In addition, an optional range of a synchronization sequence is relatively small in a relatively large frequency offset. Therefore, design of a synchronization signal between multiple cells needs to be reconsidered, so that synchronization performance of the synchronization signal in the relatively large frequency offset meets a requirement, and interference can be effectively resisted in a co-channel interference (from another cell) case.

In this embodiment of the present invention, the receiving device may further determine, according to a result of each sliding correlation operation, a cell identifier of a cell in which the receiving device is located, or a cell group identifier of a cell group in which the receiving device is located. Therefore, the synchronization signal resists interference in the relatively large frequency offset. For example, in a single-frequency network of different cells, the synchronization signal can effectively resist inter-cell interference in the relatively large frequency offset.

Further, the receiving device may perform, according to the result of the sliding correlation operation, carrier frequency synchronization, that is, frequency offset estimation.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A receiving device, comprising:
   a receiving module, configured to receive a synchronization signal, wherein the synchronization signal comprises a first signal and a second signal, the first signal comprises N1 generalized Zadoff-Chu (ZC) sequences, the second signal comprises N2 generalized ZC sequences, N1 and N2 are positive integers, and the generalized ZC sequence is generated as:

$$ZC(n)=e^{-j\pi un(n+1+2q)/L}, q\in Z, L\in Z^+, n=0,1,\ldots L-1,$$
$$0<|u|<L, u\in R,$$

wherein
   u is a root index of the generalized ZC sequence, q is an offset index of the generalized ZC sequence, L is a length of the generalized ZC sequence, and L is a positive integer;
   different cells or different cell groups correspond to different second signals; and
   there are at least two generalized ZC sequences in (N1+N2) generalized ZC sequences comprising the N1 generalized ZC sequences and the N2 generalized ZC sequences, and root indexes of the two generalized ZC sequences are different;
   there are at least two generalized ZC sequences in (N1+N2) generalized ZC sequences comprising the N1 generalized ZC sequences and the N2 generalized ZC sequences, and lengths of the two generalized ZC sequences are different; and
   a processing module, configured to: perform a first sliding correlation operation on the synchronization signal by using each of the N1 generalized ZC sequences locally stored by the receiving device; traverse at least two groups of N2 generalized ZC sequences that are locally stored, and perform a second sliding correlation operation on the received synchronization signal by using each generalized ZC sequence in each group of N2 generalized ZC sequences; perform symbol timing synchronization according to a result of each first sliding correlation operation and a result of each second sliding correlation operation; and if different cells correspond to different second signals, determine, according to the result of each first sliding correlation operation and the result of each second sliding correlation operation, a cell identifier of a cell in which the receiving device is located; or if different cell groups correspond to different second signals, determine, according to the result of each first sliding correlation operation and the result of each second sliding correlation operation, a cell group identifier of a cell group in which the receiving device is located.

2. The receiving device according to of claim 1, wherein the processing module is specifically configured to:
   when N1=N2=1, the N1 generalized ZC sequence is a first generalized ZC sequence, and the N2 generalized ZC sequence is a second generalized ZC sequence, perform the first sliding correlation operation on the synchronization signal by using the first generalized ZC sequence locally stored by the receiving device; and perform the second sliding correlation operation on the synchronization signal by using each of at least two second generalized ZC sequences locally stored by the receiving device.

3. The receiving device according to claim 2, wherein the processing module is further configured to: before performing the first sliding correlation operation and the second sliding correlation operation, determine each frequency offset $f_i$ that is in a frequency offset range of the receiving device and that is an integer multiple of a symbol rate;
   when performing the first sliding correlation operation on the synchronization signal by using the first generalized ZC sequence locally stored by the receiving device, the processing module is specifically configured to:

for each determined frequency offset $f_i$, perform a sliding correlation operation on the synchronization signal by using the first generalized ZC sequence, to obtain a sliding correlation peak Corr1_$f_i$ in the frequency offset by means of calculation, wherein i=1 to P, i and P are positive integers, and P is a quantity of determined frequency offsets;

when performing the second sliding correlation operation on the synchronization signal by using each of the at least two second generalized ZC sequences locally stored by the receiving device, the processing module is specifically configured to:

for each determined frequency offset $f_i$, traverse each of the at least two second generalized ZC sequences locally stored by the receiving device; and for each traversed second generalized ZC sequence $S_j$, perform a sliding correlation operation on the synchronization signal by using the second generalized ZC sequence, to obtain a sliding correlation peak Corr2_$f_i$_$S_j$ in the second generalized ZC sequence in the frequency offset by means of calculation, wherein j=1 to Q, j and Q are positive integers, and Q is a quantity of locally stored second generalized ZC sequences; and when performing the symbol timing synchronization according to the result of each first sliding correlation operation and the result of each second sliding correlation operation, the processing module is specifically configured to:

determine, from all frequency offsets $f_i$ according to each obtained sliding correlation peak Corr1_$f_i$ and each obtained sliding correlation peak Corr2_$f_i$_$S_j$, a frequency offset $f_0$ closest to an actual frequency offset and a second generalized ZC sequence $S_0$ that corresponds to the cell in which the receiving device is located; and perform the symbol timing synchronization according to a time domain position of a sliding correlation peak Corr1_$f_0$ corresponding to the determined frequency offset $f_0$, a time domain position of a sliding correlation peak Corr2_$f_0$_$S_0$ in the second generalized ZC sequence $S_0$ in the determined frequency offset $f_0$, and a distance that is known in advance and that is between a time domain position of a start symbol occupied by the first generalized ZC sequence in the synchronization signal and a time domain position of a start symbol occupied by the second generalized ZC sequence in the synchronization signal.

4. The receiving device according to claim 3, wherein when determining, according to the result of each first sliding correlation operation and the result of each second sliding correlation operation, the cell identifier of the cell in which the receiving device is located, the processing module is specifically configured to: determine, according to a correspondence that is pre-stored by the receiving device and that is between a cell identifier and a second generalized ZC sequence, that a cell identifier corresponding to the second generalized ZC sequence $S_0$ is the cell identifier of the cell in which the receiving device is located; and/or when determining, according to the result of each first sliding correlation operation and the result of each second sliding correlation operation, the cell group identifier of the cell group in which the receiving device is located, the processing module is specifically configured to: determine, according to a correspondence that is pre-stored by the receiving device and that is between a cell group identifier and a second generalized ZC sequence, that a cell group identifier corresponding to the second generalized ZC sequence $S_0$ is the cell group identifier of the cell group in which the receiving device is located.

5. The receiving device according to claim 3, wherein the processing module is specifically configured to:

determine that a frequency offset corresponding to a sliding correlation peak Corr_max is $f_0$, wherein $$\text{Corr\_max} = \underset{i,j}{\text{MAX}}\{\text{Corr1\_}f_i + \text{Corr2\_}f_i\_S_j\};$$

and determine that a second generalized ZC sequence corresponding to the sliding correlation peak Corr_max is $S_0$.

6. A sending device, comprising:

a processor, configured to determine a synchronization signal, wherein the synchronization signal comprises a first signal and a second signal, the first signal comprises N1 generalized Zadoff-Chu (ZC) sequences, the second signal comprises N2 generalized ZC sequences, N1 and N2 are positive integers, and the generalized ZC sequence is generated as:

$$ZC(n)=e^{-j\pi un(n+1+2q)/L}, q \in Z, L \in Z^+, n=0,1,\ldots L-1,$$
$$0<|u|<L, u \in R, \text{ wherein}$$

u is a root index of the generalized ZC sequence, q is an offset index of the generalized ZC sequence, L is a length of the generalized ZC sequence, and L is a positive integer;

different cells or different cell groups correspond to different second signals; and there are at least two generalized ZC sequences in (N1+N2) generalized ZC sequences comprising the N1 generalized ZC sequences and the N2 generalized ZC sequences, and root indexes of the two generalized ZC sequences are different;

there are at least two generalized ZC sequences in (N1+N2) generalized ZC sequences comprising the N1 generalized ZC sequences and the N2 generalized ZC sequences, and lengths of the two generalized ZC sequences are different; and a transmitter, configured to send the synchronization signal determined by the processor, wherein the synchronization signal is used for symbol timing synchronization; and if different cells correspond to different second signals, the synchronization signal is further used to determine a cell identifier; or if different cell groups correspond to different second signals, the synchronization signal is further used to determine a cell group identifier, wherein the processor is further configured to synchronize with a receiving device based on the synchronization signal.

7. The sending device according to claim 6, wherein N1=N2=1.

8. The sending device according to claim 6, wherein the synchronization signal is further used for carrier frequency synchronization.

9. The sending device according to claim 6, wherein the first signal and the second signal are sent in a time division and/or frequency division manner;

the N1 generalized ZC sequences in the first signal are sent in a time division and/or frequency division manner; and the N2 generalized ZC sequences in the second signal are sent in a time division and/or frequency division manner.

10. A symbol timing synchronization method, comprising:
receiving a synchronization signal sent by a sending device, wherein the synchronization signal comprises a first signal and a second signal, the first signal comprises N1 generalized Zadoff-Chu (ZC) sequences, the second signal comprises N2 generalized ZC sequences, N1 and N2 are positive integers, and the generalized ZC sequence is generated as:

$$ZC(n)=e^{-j\pi un(n+1+2q)/L}, q \in Z, L \in Z^+, n=0,1,\ldots L-1,$$
$$0<|u|<L, u \in R, \text{ wherein}$$

u is a root index of the generalized ZC sequence, q is an offset index of the generalized ZC sequence, L is a length of the generalized ZC sequence, and L is a positive integer;
different cells or different cell groups correspond to different second signals; and
there are at least two generalized ZC sequences in (N1+N2) generalized ZC sequences comprising the N1 generalized ZC sequences and the N2 generalized ZC sequences, and root indexes of the two generalized ZC sequences are different;
there are at least two generalized ZC sequences in (N1+N2) generalized ZC sequences comprising the N1 generalized ZC sequences and the N2 generalized ZC sequences, and lengths of the two generalized ZC sequences are different; and
performing a first sliding correlation operation on the received synchronization signal by using each of the locally stored N1 generalized ZC sequences;
traversing at least two groups of N2 generalized ZC sequences that are locally stored, and performing a second sliding correlation operation on the received synchronization signal by using each generalized ZC sequence in each group of N2 generalized ZC sequences; and
performing symbol timing synchronization according to a result of each first sliding correlation operation and a result of each second sliding correlation operation; and
if different cells correspond to different second signals, determining, according to the result of each first sliding correlation operation and the result of each second sliding correlation operation, a cell identifier of a cell in which a current receiving device is located; or if different cell groups correspond to different second signals, determining, according to the result of each first sliding correlation operation and the result of each second sliding correlation operation, a cell group identifier of a cell group in which the current receiving device is located.

11. The method according to claim 10, wherein N1=N2=1;
the N1 generalized ZC sequence is a first generalized ZC sequence, and the N2 generalized ZC sequence is a second generalized ZC sequence;
the performing a first sliding correlation operation on the received synchronization signal comprises: performing the first sliding correlation operation on the received synchronization signal by using the locally stored first generalized ZC sequence; and
the traversing each of at least two groups of N2 generalized ZC sequences that are locally stored, and for each group of traversed generalized ZC sequences, performing a second sliding correlation operation on the received synchronization signal by using each generalized ZC sequence in the group of N2 generalized ZC sequences comprises:
performing the second sliding correlation operation on the received synchronization signal by using each of at least two locally stored second generalized ZC sequences.

12. The method according to claim 11, wherein
before the first sliding correlation operation and the second sliding correlation operation are performed, the method further comprises: determining each frequency offset $f_i$ that is in a frequency offset range of the current receiving device and that is an integer multiple of a symbol rate;
the performing the first sliding correlation operation on the received synchronization signal by using the locally stored first generalized ZC sequence comprises:
for each determined frequency offset $f_i$, performing a sliding correlation operation on the received synchronization signal by using the first generalized ZC sequence, to obtain a sliding correlation peak $Corr1\_f_i$ in the frequency offset by means of calculation, wherein i=1 to P, i and P are positive integers, and P is a quantity of determined frequency offsets;
the performing the second sliding correlation operation on the received synchronization signal by using each of at least two locally stored second generalized ZC sequences comprises:
for each determined frequency offset $f_i$, traversing each of the at least two locally stored second generalized ZC sequences; and for each traversed second generalized ZC sequence $S_j$, performing a sliding correlation operation on the received synchronization signal by using the second generalized ZC sequence, to obtain a sliding correlation peak $Corr2\_f_i\_S_j$ in the second generalized ZC sequence in the frequency offset by means of calculation, wherein j=1 to Q, j and Q are positive integers, and Q is a quantity of locally stored second generalized ZC sequences; and
the performing symbol timing synchronization according to a result of each first sliding correlation operation and a result of each second sliding correlation operation comprises:
determining, from all frequency offsets $f_i$ according to each obtained sliding correlation peak $Corr1\_f_i$ and each obtained sliding correlation peak $Corr2\_f_i\_S_j$, a frequency offset $f_0$ closest to an actual frequency offset and a second generalized ZC sequence $S_0$ that corresponds to the cell in which the current receiving device is located; and performing the symbol timing synchronization according to a time domain position of a sliding correlation peak $Corr1\_f_0$ corresponding to the determined frequency offset $f_0$, a time domain position of a sliding correlation peak $Corr2\_f_0\_S_0$ in the second generalized ZC sequence $S_0$ in the determined frequency offset $f_0$, and a distance that is known in advance and that is between a time domain position of a start symbol occupied by the first generalized ZC sequence in the received signal and a time domain position of a start symbol occupied by the second generalized ZC sequence in the received signal.

13. The method according to claim 12, wherein the determining, according to the result of each first sliding correlation operation and the result of each second sliding correlation operation, a cell identifier of a cell in which a current receiving device is located comprises: determining, according to a pre-stored correspondence between a cell identifier and a second generalized ZC sequence, that a cell identifier corresponding to the second generalized ZC sequence $S_0$ is the cell identifier of the cell in which the current receiving device is located; and/or the determining, according to the result of each first sliding correlation operation and the result of each second sliding correlation operation, a cell group identifier of a cell group in which the current receiving device is located comprises: determining, according to a pre-stored correspondence between a cell group identifier and a second generalized ZC sequence, that a cell group identifier corresponding to the second generalized ZC sequence $S_0$ is the cell group identifier of the cell group in which the current receiving device is located.

14. The method according to claim 12, wherein the determining, from all frequency offsets $f_i$ according to each obtained sliding correlation peak $Corr1\_f_i$ and each obtained sliding correlation peak $Corr2\_f_i\_S_j$, a frequency offset $f_0$ closest to an actual frequency offset and a second generalized ZC sequence $S_0$ that corresponds to the cell in which the current receiving device is located comprises:

determining that a frequency offset corresponding to a sliding correlation peak $Corr\_max$ is $f_0$, wherein $$Corr\_max = \mathrm{MAX}_{i,j}\{Corr1\_f_i + Corr2\_f_i\_S_j\};$$

and determining that a second generalized ZC sequence corresponding to the sliding correlation peak $Corr\_max$ is $S_0$.

15. A symbol timing synchronization method, comprising:

determining a synchronization signal, wherein the synchronization signal comprises a first signal and a second signal, the first signal comprises N1 generalized Zadoff-Chu (ZC) sequences, the second signal comprises N2 generalized ZC sequences, N1 and N2 are positive integers, and the generalized ZC sequence is generated as:

$ZC(n)=e^{-j\pi un(n+1+2q)/L}, q\in Z, L\in Z^+, n=0,1,\ldots L-1,$
$0<|u|<L, u\in R,$ wherein u is a root index of the generalized ZC sequence, q is an offset index of the generalized ZC sequence, L is a length of the generalized ZC sequence, and L is a positive integer;

different cells or different cell groups correspond to different second signals; and there are at least two generalized ZC sequences in (N1+N2) generalized ZC sequences comprising the N1 generalized ZC sequences and the N2 generalized ZC sequences, and root indexes of the two generalized ZC sequences are different;

there are at least two generalized ZC sequences in (N1+N2) generalized ZC sequences comprising the N1 generalized ZC sequences and the N2 generalized ZC sequences, and lengths of the two generalized ZC sequences are different;

sending the synchronization signal; and synchronizing with a receiving device based on the synchronization signal.

16. The method according to claim 15, wherein N1=N2=1; and the N1 generalized ZC sequence is a first generalized ZC sequence, and the N2 generalized ZC sequence is a second generalized ZC sequence.

17. The method according to claim 15, wherein the synchronization signal is further used for carrier frequency synchronization.

18. The method according to claim 15, wherein the sending the synchronization signal comprises:

sending the first signal and the second signal in a time division and/or frequency division manner;

sending the N1 generalized ZC sequences in the first signal in a time division and/or frequency division manner; and sending the N2 generalized ZC sequences in the second signal in a time division and/or frequency division manner.

19. A wireless communications system, comprising a sending device and a receiving device, wherein the sending device is configured to send a synchronization signal, wherein the synchronization signal comprises a first signal and a second signal, the first signal comprises N1 generalized Zadoff-Chu (ZC) sequences, the second signal comprises N2 generalized ZC sequences, N1 and N2 are positive integers, and the generalized ZC sequence is generated as:

$ZC(n)=e^{-j\pi un(n+1+2q)/L}, q\in Z, L\in Z^+, n=0,1,\ldots L-1,$
$0<|u|<L, u\in R,$ wherein u is a root index of the generalized ZC sequence, q is an offset index of the generalized ZC sequence, L is a length of the generalized ZC sequence, and L is a positive integer;

different cells or different cell groups correspond to different second signals; and there are at least two generalized ZC sequences in (N1+N2) generalized ZC sequences comprising the N1 generalized ZC sequences and the N2 generalized ZC sequences, and root indexes of the two generalized ZC sequences are different;

there are at least two generalized ZC sequences in (N1+N2) generalized ZC sequences comprising the N1 generalized ZC sequences and the N2 generalized ZC sequences, and lengths of the two generalized ZC sequences are different; and the receiving device is configured to:

receive the synchronization signal;

perform a first sliding correlation operation on the received synchronization signal by using each of the locally stored N1 generalized ZC sequences;

traverse at least two groups of N2 generalized ZC sequences that are locally stored, and perform a second sliding correlation operation on the received synchronization signal by using each generalized ZC sequence in each group of N2 generalized ZC sequences; and perform symbol timing synchronization according to a result of each first sliding correlation operation and a result of each second sliding correlation operation; and if different cells correspond to different second signals, determine, according to the result of each first sliding correlation operation and the result of each second sliding correlation operation, a cell identifier of a cell in which the current receiving device is located; or if different cell groups correspond to different second signals, determine, according to the result of each first sliding correlation operation and the result of each second sliding correlation operation, a cell group identifier of a cell group in which the current receiving device is located.

\* \* \* \* \*